United States Patent
Jo et al.

(10) Patent No.: US 10,387,981 B2
(45) Date of Patent: Aug. 20, 2019

(54) SYSTEM AND METHOD FOR CONFIDENTIALLY ISSUING AND MANAGING DELIVERY WAYBILL USING VIRTUAL PERSONAL INFORMATION MATCHED WITH CREDIT CARD INFORMATION

(71) Applicant: K CLOUD CO., LTD., Seoul (KR)

(72) Inventors: Nam Seob Jo, Seoul (KR); Chan Heui Park, Seoul (KR); Han Joo Kim, Yongin-si (KR); Kwang Su Woo, Namyangju-si (KR); Jeong Ho Ko, Incheon (KR)

(73) Assignee: K CLOUD CO., LTD., Seoul (KR)

( * ) Notice: Subject to any disclaimer, the term of this patent is extended or adjusted under 35 U.S.C. 154(b) by 0 days.

(21) Appl. No.: 16/324,567

(22) PCT Filed: Aug. 11, 2017

(86) PCT No.: PCT/KR2017/008716
§ 371 (c)(1),
(2) Date: Feb. 10, 2019

(87) PCT Pub. No.: WO2018/030828
PCT Pub. Date: Feb. 15, 2018

(65) Prior Publication Data
US 2019/0220942 A1 Jul. 18, 2019

(30) Foreign Application Priority Data
Aug. 11, 2016 (KR) .................. 10-2016-0102105

(51) Int. Cl.
*G06Q 30/00* (2012.01)
*G06Q 50/26* (2012.01)
(Continued)

(52) U.S. Cl.
CPC ....... *G06Q 50/265* (2013.01); *G06Q 10/0838* (2013.01); *G06Q 30/0633* (2013.01)

(58) Field of Classification Search
CPC ............................................. G06Q 30/06–08
(Continued)

(56) References Cited

U.S. PATENT DOCUMENTS

2009/0157531 A1* 6/2009 Bui .................. G06Q 20/02
705/26.1
2010/0088305 A1* 4/2010 Fournier ............... G06F 21/552
707/706

(Continued)

FOREIGN PATENT DOCUMENTS

KR 10-2007-0105159 A 10/2007
KR 10-0806501 B1 2/2008
(Continued)

*Primary Examiner* — Ethan D Civan
(74) *Attorney, Agent, or Firm* — Rabin & Berdo, P.C.

(57) ABSTRACT

Disclosed are a system and method for confidentially issuing and managing a delivery waybill that enables a customer to order and receive merchandise without inputting actual personal information of the customer every time in every online shopping mall providing merchandise that the customer wishes to purchase and that is capable of preventing the leakage of the personal information of the customer, which may occur in an online shopping mall, a merchandise supply company, etc., wherein virtual personal information, rather than the actual personal information of the customer, is used in the online shopping mall, and access account information, a customer order number, and order status information are confirmed in order to prevent illegal issuance of a delivery waybill, whereby the system for confidentially issuing and managing the delivery waybill can be operated in an independent and safe manner.

23 Claims, 3 Drawing Sheets

(51) Int. Cl.
*G06Q 10/08* (2012.01)
*G06Q 30/06* (2012.01)

(58) Field of Classification Search
USPC .................................................. 705/26.1–27.2
See application file for complete search history.

(56) References Cited

U.S. PATENT DOCUMENTS

| | | | |
|---|---|---|---|
| 2010/0138314 A1* | 6/2010 | Li | G06Q 20/12 705/26.1 |
| 2013/0138536 A1 | 5/2013 | Koh et al. | |
| 2014/0259093 A1* | 9/2014 | Narayanaswamy | H04L 67/20 726/1 |

FOREIGN PATENT DOCUMENTS

| | | |
|---|---|---|
| KR | 10-0875520 B1 | 12/2008 |
| KR | 10-2010-0050816 A | 5/2010 |
| KR | 10-1206473 B1 | 12/2012 |
| KR | 10-1322466 B1 | 10/2013 |

* cited by examiner

SYSTEM AND METHOD FOR CONFIDENTIALLY ISSUING AND MANAGING DELIVERY WAYBILL USING VIRTUAL PERSONAL INFORMATION MATCHED WITH CREDIT CARD INFORMATION

TECHNICAL FIELD

The present invention relates to a system and method for confidentially issuing and managing a delivery waybill using virtual personal information that are capable of using virtual personal information corresponding to actual personal information of a recipient in an online shopping mall, confirming a customer order number in the online shopping mall, thereby preventing illegal issuance of a delivery waybill, and more safely and conveniently outputting the delivery waybill without a primary merchandise supply company system connected to the online shopping mall and subordinate merchandise supply company systems thereof storing the personal information of the customer.

More particularly, the present invention relates to a system and method for confidentially issuing and managing a delivery waybill configured such that, when a customer matches virtual personal information with his/her credit card information and then inputs his/her credit card information in a payment window at the time of ordering merchandise in each shopping mall over the Internet, the virtual personal information with the credit card information of the customer is automatically input as shipping destination information, whereby it is possible to easily input the shipping destination information, such that the virtual personal information, rather than the actual personal information of the customer, is used as the shipping destination information, whereby it is possible to improve security, such that a customer order number in the online shopping mall is confirmed at the time of outputting a delivery waybill, whereby it is possible to prevent illegal issuance of the delivery waybill, and such that a primary merchandise supply company system connected to the online shopping mall and subordinate merchandise supply company systems thereof do not store the personal information of the customer, whereby it is possible to prevent leakage of the personal information of the customer.

BACKGROUND ART

With the rapid growth of online shopping markets in modern society, there is high possibility that actual personal information of merchandise recipients will be leaked by online sellers who sell merchandise to be ordered by customers, such as home shopping malls or Internet shopping malls, and business partners who receive the actual personal information of the merchandise recipients from the online sellers in order to deliver the merchandise.

In addition, the responsibility of the online sellers and the business partners who deliver merchandise has become greater as the result of strengthening individual information protection laws for protecting individual information, such as personal information of customers.

In order to solve the above problems, technologies that enable a plurality of business partners to deliver merchandise without storing actual personal information of recipients in a processing system possessed by the business partners have been developed.

Systems adopting these technologies are shown in FIG. 1. For example, as is simply shown in FIG. 1, a first type of scheme is configured such that respective Internet shopping malls A and B (11 and 12) have their own confidential delivery waybill output systems and business partner 1 (13) who delivers merchandise accesses a corresponding one of the confidential delivery waybill output systems in order to output a confidential delivery waybill for customer order information of a customer, e.g. orderer a (10) (see FIG. 1(A)), and a second type of scheme is configured to include an independent hub system 30 capable of receiving personal information of recipients from a plurality of Internet shopping malls X and Y (21 and 22) in order to output delivery waybills such that business partner 2 (23) who delivers merchandise accesses the hub system in order to output a confidential delivery waybill for customer order information of a customer, e.g. orderer b (20) (see FIG. 1(B)).

In the first type of scheme or the second type of scheme, however, the actual personal information of a recipient must be input in every online shopping mall at the time of ordering merchandise, which is inconvenient, and the personal information of the recipient, input at the time of ordering merchandise, is stored in the respective shopping malls or in the hub system, whereby individual information may be leaked in large quantities, and delivery waybills may be illegally issued.

Therefore, there is urgent necessity for a scheme that is capable of preventing the leakage of actual personal information of recipients in large quantities through the provision of an independent personal information managing system that is capable of overcoming the inconveniences of a customer inputting personal information, such as a name, telephone, and address, as shipping destination information in every online shopping mall or for every order at the time of ordering merchandise, preventing actual personal information of a recipient from being stored in the online shopping mall, and preventing the actual personal information of the recipient, input every time, from being repeatedly stored in the hub system, and a confidential delivery waybill issuing system that is capable of confirming a customer order number provided by an online shopping mall system when a confidential delivery waybill is output using virtual personal information, whereby it is possible to prevent illegal issuance of the delivery waybill.

Patent Document

Korean Registered Patent No. 10-1206473 (2012.12.24)

DISCLOSURE

Technical Problem

Therefore, the present invention has been made in view of the above problems, and it is an object of the present invention to provide a method of confidentially issuing and managing a delivery waybill that enables a customer to order and receive merchandise without inputting actual personal information of the customer every time in every online shopping mall providing merchandise that the customer wishes to purchase and that is capable of preventing the leakage of the personal information of the customer, which may occur in an online shopping mall, a merchandise supply company, etc., wherein virtual personal information, rather than the actual personal information of the customer, is used to order merchandise in the online shopping mall, and particularly, when credit card information of the customer for payment is input in a payment window at the time of ordering merchandise, virtual personal information matched with the credit card information is automatically input as shipping destination information, whereby it is not necessary to additionally input the shipping destination information, which is convenient.

It is another object of the present invention to provide an independent and safe system for confidentially issuing and managing a delivery waybill that is capable of preventing a merchandise supply company from using not only actual personal information of a customer but also virtual personal information, and confirming a customer order number provided by an online shopping mall and a customer order number provided by the merchandise supply company in order to prevent illegal issuance of a delivery waybill, whereby it is possible for the customer to conveniently purchase and receive merchandise through online shopping free of worry about leakage of his/her personal information.

Technical Solution

In accordance with an aspect of the present invention, the above objects can be accomplished by the provision of a method of confidentially issuing and managing a delivery waybill using virtual personal information, the method including:

a customer terminal (100) or a confidential delivery waybill issuing system terminal (270) providing actual personal information of a customer to a confidential delivery waybill issuing system (S1001);

the confidential delivery waybill issuing system creating virtual personal information corresponding to the actual personal information of the customer, received from the customer terminal or from the confidential delivery waybill issuing system terminal (270), the virtual personal information not being actual personal information (S1002);

a primary merchandise supply company system (400) registering online shopping mall system access account information thereof at the confidential delivery waybill issuing system (200) (S1004);

the customer terminal (100) requesting a payment service company system (700) to match the virtual personal information with credit card information of the customer (S2001);

the payment service company system (700) matching the virtual personal information with the credit card information of the customer (S2002);

the customer terminal (100) providing order information for purchasing merchandise and payment information to an online shopping mall system (S1006);

the online shopping mall system (300) requesting the virtual personal information matched with the credit card information from the payment service company system (700) (S2003);

the payment service company system (700) providing the requested virtual personal information matched with the credit card information to the online shopping mall system (300) (S2004);

the online shopping mall system (300) displaying the virtual personal information matched with the credit card information on the customer terminal (100) (S2005);

the customer terminal (100) selecting any one piece of the displayed virtual personal information (S2006);

the online shopping mall system (300) automatically inputting the virtual personal information selected at step S2006 as shipping destination information (S2007);

the online shopping mall system (300) creating customer order information including a customer order number and the virtual personal information based on the order information, received from the customer terminal (100), and the virtual personal information automatically input at step S2007 (S1007);

the online shopping mall system (300) providing the customer order information including the customer order number and the virtual personal information and registered access account information of the primary merchandise supply company system to the confidential delivery waybill issuing system (S1008);

the online shopping mall system (300) providing the customer order information with the virtual personal information removed to the primary merchandise supply company system (S1009);

the primary merchandise supply company system creating shipping information including the customer order number and logistics company information based on the customer order information with the virtual personal information removed (S1010);

the primary merchandise supply company system providing the created shipping information to the confidential delivery waybill issuing system (S1011);

the primary merchandise supply company system requesting the confidential delivery waybill issuing system to output a delivery waybill corresponding to the shipping information (S1012);

the confidential delivery waybill issuing system receiving logistics delivery information from a logistics company system (S1013);

the confidential delivery waybill issuing system (200) confirming whether a same access account as the access account of the primary merchandise supply company system, acquired from the online shopping mall system, exists in the confidential delivery waybill issuing system and whether a same customer order number as the customer order number included in the shipping information, acquired from the primary merchandise supply company system, exists in the confidential delivery waybill issuing system (an information confirming step) (S1014);

upon confirming at the information confirming step (S1014) that the same customer order number exists and the same access account exists, the confidential delivery waybill issuing system extracting the actual personal information of the customer corresponding to the virtual personal information included in the customer order information, received from the online shopping mall system, from a storage means and combining the extracted actual personal information of the customer, the shipping information, received from the primary merchandise supply company system, and the logistics delivery information, received from the logistics company system, to create delivery waybill output information (S1015);

the confidential delivery waybill issuing system directly transmitting the created delivery waybill output information to an output unit of the primary merchandise supply company system requesting to output the delivery waybill (S1016);

the confidential delivery waybill issuing system (200) creating shipping request information using the delivery waybill output information (S1017); and the confidential delivery waybill issuing system (200) providing the created shipping request information to the logistics company system (S1018).

In accordance with another aspect of the present invention, the above objects can be accomplished by the provision of a system for confidentially issuing and managing a delivery waybill using virtual personal information, the system including:

a customer terminal (100) for providing actual personal information of a customer to a confidential delivery waybill issuing system (200), confirming virtual personal information corresponding to the actual personal information of the customer from the confidential delivery waybill issuing system, providing order information for purchasing merchandise and payment information to an online shopping mall system, credit card information being used as the payment information, providing the credit card information and the virtual personal information to a payment service company system (700), and requesting the payment service company system to match the virtual personal information with the credit card information;

the confidential delivery waybill issuing system (200) for creating virtual personal information corresponding to the received actual personal information of the customer, forming and storing relationship information between an online shopping mall access account of a primary merchandise supply company and a merchandise supply company in response to a request for registering an access account from a primary merchandise supply company system, determining whether to create delivery waybill output information using the online shopping mall access account information of the primary merchandise supply company and a customer order number included in customer order information, received from the online shopping mall system, upon determining to create the delivery waybill output information, creating the delivery waybill output information using the actual personal information of the customer, logistics delivery information, and shipping information, and directly transmitting the created delivery waybill output information to an output unit of a merchandise supply company system requesting to output a delivery waybill;

the online shopping mall system (300) for creating customer order information including the virtual personal information and a customer order number using the order information, received from the customer terminal, and the virtual personal information selected by the customer terminal, providing the customer order information with the virtual personal information removed to the primary merchandise supply company system (400), providing the customer order information including the virtual personal information and the customer order number and the access account information of the primary merchandise supply company system to the confidential delivery waybill issuing system, upon receiving the credit card information as the payment information from the customer terminal, requesting virtual personal information matched with the received credit card information from the payment service company system, and providing the virtual personal information, received from the payment service company system, to the customer terminal;

the primary merchandise supply company system (400) for requesting the confidential delivery waybill issuing system (200) to register an online shopping mall access account thereof and to register secondary to Nth-order merchandise supply companies, which are subordinate merchandise supply companies thereof, as the online shopping mall access account thereof, creating shipping information using the customer order information with the virtual personal information removed, received from the online shopping mall system, providing the created shipping information to the confidential delivery waybill issuing system and simultaneously requesting the confidential delivery waybill issuing system to output a delivery waybill, and in a case in which merchandise is supplied through subordinate merchandise supply company systems thereof, providing the customer order information with the virtual personal information removed, received from the online shopping mall system, to any one of secondary to Nth-order merchandise supply company systems without creating the shipping information;

the secondary to Nth-order merchandise supply company systems (500) for, upon receiving the customer order information with the virtual personal information removed, creating shipping information using the received customer order information with the virtual personal information removed and providing the created shipping information to the confidential delivery waybill issuing system and simultaneously requesting the confidential delivery waybill issuing system to output a delivery waybill; and the payment service company system (700) for matching the credit card information and the virtual personal information, received from the customer terminal 100, with each other, and upon receiving a request for virtual personal information matched with specific credit card information from the online shopping mall system (300), providing the requested virtual personal information matched with the specific credit card information to the online shopping mall system (300).

Advantageous Effects

According to the present invention, it is possible for an online shopping customer to order and receive merchandise using simple virtual personal information without inputting actual personal information as customer information every time in every online shopping mall providing merchandise that the customer wishes to purchase or for every order, whereby very convenient online shopping is possible.

In addition, when credit card information of the customer for payment is input in a payment window at the time of ordering merchandise, virtual personal information matched with the credit card information is automatically input as shipping destination information, whereby it is not necessary to additionally input the shipping destination information, which is convenient.

In addition, the actual personal information of the customer provided as the shipping destination information is stored once only in an independent confidential delivery waybill issuing system, and only virtual personal information, rather than the actual personal information of the customer, is stored in online shopping malls, whereby it is possible to solve the conventional problem in which the actual personal information of the customer is stored in every online shopping mall, which leads to the leakage of actual personal information of customers in large quantities.

In addition, neither actual personal information of the customer nor the virtual personal information is stored in merchandise supply companies, whereby it is possible to fundamentally prevent the leakage of information of customers in large quantities.

In addition, a customer order number, accounts of the merchandise supply companies, etc. are confirmed at the time of creating delivery waybill output information, whereby it is possible to prevent illegal issuance of a delivery waybill.

In addition, a primary merchandise supply company connected to each online shopping mall registers the primary merchandise supply company and its subordinate merchandise supply companies (secondary to Nth-order merchandise supply companies) at a confidential delivery waybill issuing system as an online shopping mall access account thereof, whereby it is possible for the subordinate merchandise supply companies (secondary to Nth-order merchandise supply companies) to output delivery waybills through the confidential delivery waybill issuing system using the registered access account of the primary merchandise supply company, rather than directly via the primary merchandise supply company.

DESCRIPTION OF REFERENCE NUMERALS

Figure 1:
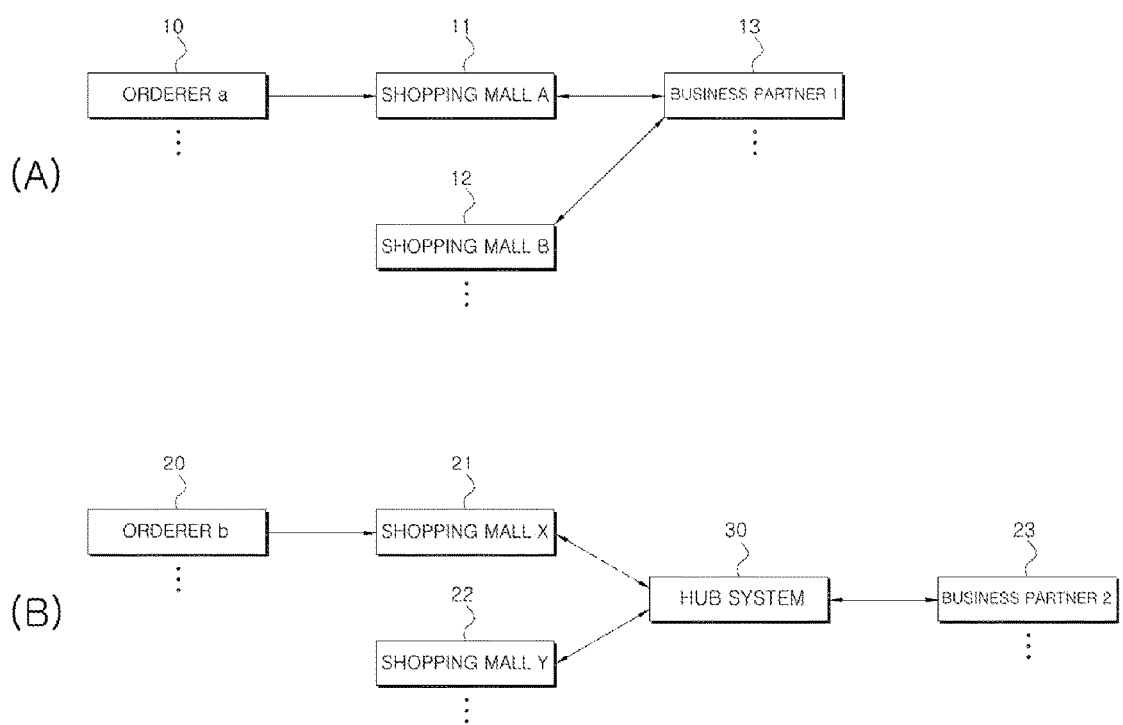
FIG. 1 is a view showing a conventional order and delivery system.

100: Customer terminal
200: Confidential delivery waybill issuing system
300: Online shopping mall system
400: Primary merchandise supply company system
500: Secondary to Nth-order merchandise supply company systems
600: Logistics company system
700: Payment service company system

BEST MODE

Hereinafter, preferred embodiments of the present invention will be described in detail with reference to the accompanying drawings such that the preferred embodiments of the present invention can be easily implemented by a person having ordinary skill in the art to which the present invention pertains.

The present invention may be embodied in various different forms, and is not limited to the embodiments illustrated herein. In order to definitely describe the embodiments of the present invention, parts that are not related to the description of the embodiment of the present invention are omitted from the drawings, and similar reference numerals will be used throughout the drawings to refer to similar parts.

Figure 2:
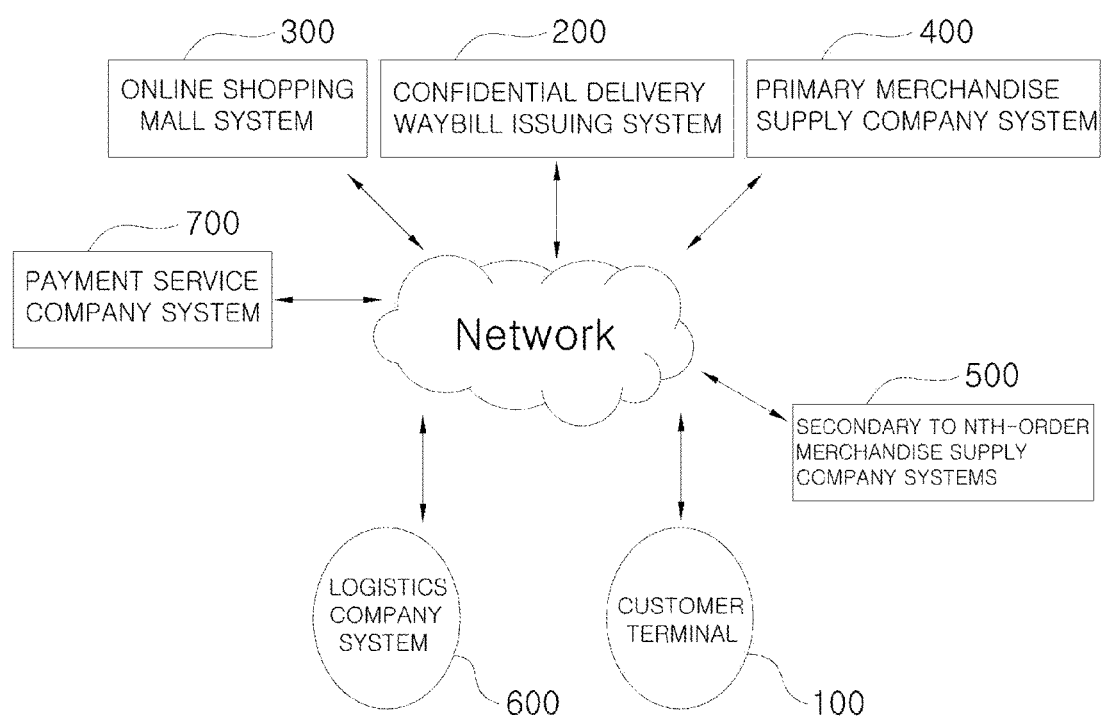
FIG. 2 is a view showing a system for confidentially issuing and managing a delivery waybill using virtual personal information matched with credit card information according to an embodiment of the present invention.

FIG. 2 schematically shows principal components constituting a system for confidentially issuing and managing a delivery waybill using virtual personal information matched with credit card information according to an embodiment of the present invention. Hereinafter, a description will be given of the order of a customer, the output of a delivery waybill, and the delivery of merchandise according to the present invention in the system for confidentially issuing and managing the delivery waybill using virtual personal information matched with credit card information according to the embodiment of the present invention shown in FIG. 2.

The network shown in FIG. 2 may be provided in a wired manner and/or in a wireless manner. In addition, the network may be provided in the form of any of various interfaces using broadcasting networks, such as terrestrial broadcasting, satellite broadcasting, and cable broadcasting, as well as a wired Internet, a wireless Internet, a satellite network, a wired telephone network, a wireless telephone network, and a mobile telephone network.

The system for confidentially issuing and managing the delivery waybill using virtual personal information matched with credit card information according to the embodiment of the present invention is characterized in that it includes a customer terminal 100, a confidential delivery waybill issuing system 200, an online shopping mall system 300, a primary merchandise supply company system 400, secondary to Nth-order merchandise supply company systems 500, a logistics company system 600, and a payment service company system 700.

The customer terminal 100 accesses the confidential delivery waybill issuing system 200 in order to provide actual personal information of the customer to the confidential delivery waybill issuing system, and receives virtual personal information corresponding to the actual personal information of the customer from the confidential delivery waybill issuing system.

In addition, the actual personal information of the customer may be provided to the confidential delivery waybill issuing system through a confidential delivery waybill issuing system terminal 270 in order to receive the virtual personal information, although the actual personal information of the customer is provided to the confidential delivery waybill issuing system 200 through the customer terminal 100 in order to receive the virtual personal information, as described above. The case in which the actual personal information of the customer is provided to the confidential delivery waybill issuing system through the confidential delivery waybill issuing system terminal 270 is the case in which the customer requests virtual personal information through the submission of a related document and, in response thereto, the actual personal information of the customer is provided to the confidential delivery waybill issuing system through the confidential delivery waybill issuing system terminal 270.

The actual personal information of the customer, which the customer terminal or the confidential delivery waybill issuing system terminal 270 provides to the confidential delivery waybill issuing system, is characterized in that it includes at least one of a name, telephone number, or address.

The virtual personal information, received as the result of providing the actual personal information of the customer to the confidential delivery waybill issuing system through the customer terminal 100 online or as the result of providing the actual personal information of the customer to the confidential delivery waybill issuing system through the confidential delivery waybill issuing system terminal 270 offline, may be confirmed through the customer terminal online or may be confirmed offline (for example, through the mail or a card having virtual personal information recorded therein).

The customer terminal 100 provides order information for purchasing merchandise and payment information to each online shopping mall system.

The order information for purchasing merchandise is information about a merchandise order that does not include the actual personal information of the customer, and the payment information is price payment information for the ordered merchandise, such as general credit card information, preferably credit card number.

In addition, shipping destination information is input to the online shopping mall system, in addition to the order information for purchasing merchandise and the payment information.

In the present invention, virtual personal information, rather than the actual personal information of the customer, is input as the shipping destination information. In the present invention, however, the customer does not need to directly input the virtual personal information into a shipping destination information input window. When the credit card information of the customer is input as the payment information, the virtual personal information matched with the credit card information of the customer is automatically input into the shipping destination input window.

Described specifically, the customer requests the payment service company system 700 to match the virtual personal information, received from the confidential delivery waybill issuing system 200, with his/her credit card information in advance.

The payment service company system 700 may be a general credit card company system or a company system that runs a simple payment service system. In the present invention, the payment service company system is not limited to a credit card company system or to a company system that runs the simple payment service system, but may include any system capable of managing a payment service.

Upon receiving the customer's request to match the virtual personal information with the credit card information of the customer, the payment service company system 700 matches the requested virtual personal information with the credit card information of the customer.

For example, the virtual personal information may be matched with the credit card information of the customer in the form of credit card information (12**-**)—virtual personal information ("Cheongwadae").

In the case in which the customer requests to match a plurality of pieces of virtual personal information with his/her credit card information, at least one piece of virtual personal information may be matched with the credit card information of the customer.

The payment service company system 700 stores and manages the credit card information of the customer and the virtual personal information in the form of a matching table for each customer, and when the online shopping mall system 300 requests virtual personal information matched with specific credit card information, the payment service company system provides the requested virtual personal information to the online shopping mall system.

When the customer matches the virtual personal information with his/her credit card information through the payment service company system 700 and inputs the order information and the payment information through the customer terminal 100, as described above, the virtual personal information, which will be used as the shipping destination information, is automatically input at the time of inputting the payment information, even though the shipping destination information is not directly input.

The process in which the virtual personal information, which will be used as the shipping destination information, is automatically input at the time of inputting the payment information will be described.

The customer provides the payment information to the online shopping mall system through the customer terminal 100. The payment information of the customer may be a credit card number. When the credit card number is input as the payment information, the online shopping mall system requests virtual personal information matched with the input credit card information from the payment service company system, and upon receiving the request, the payment service company system provides the virtual personal information matched with the credit card information to the online shopping mall system.

One or more pieces of virtual personal information may be matched with the credit card information. This depends on the number of pieces of virtual personal information that the customer requests the payment service company system to match with his/her credit card information.

Upon receiving the virtual personal information matched with the credit card information from the payment service company system, the online shopping mall system allows the customer terminal to confirm and select the received virtual personal information.

For example, in the case in which a plurality of pieces of virtual personal information is matched with the credit card information, the plurality of pieces of virtual personal information is provided to the customer terminal in the form of a popup window, and when the customer selects one from among the plurality of pieces of virtual personal information, the selected virtual personal information is automatically input as the shipping destination information.

Even in the case in which only one piece of virtual personal information is matched with the credit card information, the process is executed in the same manner as set forth above. That is, one piece of virtual personal information is provided to the customer terminal in the form of a popup window, and when the customer selects the provided virtual personal information, the selected virtual personal information is automatically input as the shipping destination information.

The virtual personal information, selected and automatically input through the above process, is used as a basis for creating customer order information, a description of which will follow.

The virtual personal information is not the actual personal information of the customer but is information corresponding to the actual personal information of the customer, received from the confidential delivery waybill issuing system.

The online shopping mall system 300 creates customer order information based on the order information, provided by the customer, and the virtual personal information, acquired at the time of inputting the payment information.

The customer order information includes at least the virtual personal information and customer order number. After creating the customer order information, the online shopping mall system provides the customer order information including the virtual personal information and the customer order number to the confidential delivery waybill issuing system, and provides the customer order information with the virtual personal information removed to the primary merchandise supply company system 400.

That is, the customer order information that the primary merchandise supply company system 400 receives from the online shopping mall system 300 includes no virtual personal information.

In addition, when providing the customer order information including the virtual personal information and the customer order number to the confidential delivery waybill issuing system 200, the online shopping mall system 300 also provides online shopping mall access account information of the primary merchandise supply company, registered at the online shopping mall system, to the confidential delivery waybill issuing system. In addition, order status information may also be provided.

The primary merchandise supply company system 400 registers an access account (online shopping mall access account of the primary merchandise supply company) at the online shopping mall system in order to access the online shopping mall system.

The primary merchandise supply company system 400 requests the confidential delivery waybill issuing system to register the online shopping mall access account of the primary merchandise supply company.

Upon receiving the request, the confidential delivery waybill issuing system forms relationship information between the access account and the merchandise supply company and stores the formed relationship information in a storage means thereof.

For example, it is assumed that the online shopping mall access account of the primary merchandise supply company system 400 registered at the online shopping mall system is A.

In this case, when registration is performed, the relationship information "access account A—primary merchandise supply company" is stored and managed in the confidential delivery waybill issuing system.

In addition, the primary merchandise supply company system 400 requests the confidential delivery waybill issuing system to register the secondary to Nth-order merchandise supply companies, which are its subordinate merchandise supply companies, as its own access account.

In this case, when registration is performed, the relationship information "access account A—primary merchandise supply company, secondary to Nth-order merchandise supply companies" is stored and managed in the confidential delivery waybill issuing system.

That is, information about the merchandise supply company linked to information about the online shopping mall access account of the primary merchandise supply company is stored and managed in the confidential delivery waybill issuing system in the form of a matching table.

That is, the merchandise supply company information is stored and managed in the form of "access account:merchandise supply company".

In the case in which the primary merchandise supply company system 400 wishes to directly supply the ordered merchandise, the primary merchandise supply company system creates shipping information based on the customer order information, received from the online shopping mall system, and provides the created shipping information to the confidential delivery waybill issuing system.

In the above description, the customer order information that the primary merchandise supply company system 400 receives from the online shopping mall system includes no virtual personal information. That is, the online shopping mall system provides the customer order information with the virtual personal information removed to the primary merchandise supply company system 400.

Consequently, the shipping information that the primary merchandise supply company system 400 provides to the confidential delivery waybill issuing system also includes no virtual personal information.

Naturally, the shipping information does not include the virtual personal information of the customer but includes the customer order number.

The reason for this is that the primary merchandise supply company system 400 generates the shipping information based on the customer order information (information including no virtual personal information), received from the online shopping mall system, and the customer order information, received from the online shopping mall system, does not include the virtual personal information but includes the customer order number.

In addition, the shipping information may include logistics company information, an online shopping mall name, access account information, the collection due date of the ordered merchandise, the name of the ordered merchandise, the quantity of the ordered merchandise, the price of the ordered merchandise, the quantity of packaging boxes for packaging the ordered merchandise, the kind of packaging boxes, a shipping charge, and a shipping message, in addition to the customer order number.

The access account information is "online shopping mall access account information of the primary merchandise supply company" necessary for the primary merchandise supply company system 400 to access the online shopping mall system, which is access account information that the primary merchandise supply company system 400 requests the confidential delivery waybill issuing system to register.

In addition, the primary merchandise supply company system 400 requests the confidential delivery waybill issuing system to output a delivery waybill in addition to the provision of the shipping information.

In the case in which the primary merchandise supply company does not supply the merchandise but any one of the secondary to Nth-order merchandise supply companies, which are its subordinate merchandise supply companies, supplies the merchandise (in the case in which the primary merchandise supply company system requests any one of the secondary to Nth-order merchandise supply companies, which are its subordinate merchandise supply companies, to supply the merchandise), the primary merchandise supply company system provides the customer order information (information including no virtual personal information), received from the online shopping mall system, to any one of the secondary to Nth-order merchandise supply company systems 500, which are its subordinate merchandise supply company systems. At this time, the primary merchandise supply company system creates no shipping information.

Any one of the secondary to Nth-order merchandise supply company systems 500, which acquires the customer order information (information including no virtual personal information), creates shipping information based on the acquired customer order information (information including no virtual personal information), and provides the created shipping information to the confidential delivery waybill issuing system.

Naturally, the shipping information does not include the virtual personal information of the customer but includes the customer order number. In addition, the shipping information may include logistics company information, an online shopping mall name, access account information, the collection due date of the ordered merchandise, the name of the ordered merchandise, the quantity of the ordered merchandise, the price of the ordered merchandise, the quantity of packaging boxes for packaging the ordered merchandise, the kind of packaging boxes, a shipping charge, and a shipping message.

The access account information is access account information of the primary merchandise supply company system, which is the superordinate merchandise supply company of the secondary to Nth-order merchandise supply companies. That is, the access account information is "online shopping mall access account information of the primary merchandise supply company" necessary for the primary merchandise supply company system 400 to access the online shopping mall system, which is access account information that the primary merchandise supply company system 400 requests the confidential delivery waybill issuing system to register.

In addition, any one of the secondary to Nth-order merchandise supply company systems 500 requests the confidential delivery waybill issuing system to output a delivery waybill in addition to the provision of the shipping information.

The logistics company system 600 provides logistics delivery information to the confidential delivery waybill issuing system. The logistics delivery information may include a collection point code, a collection point name, a collection date, a destination terminal code, a destination terminal name, and a delivery waybill number, which are provided by each logistics company and are necessary to output a delivery waybill.

The confidential delivery waybill issuing system 200 may receive the actual personal information of the customer through the customer terminal, or may receive the actual personal information of the customer through the confidential delivery waybill issuing system terminal 270.

The confidential delivery waybill issuing system 200 creates virtual personal information corresponding to the received actual personal information of the customer.

The actual personal information of the customer, which the customer terminal or the confidential delivery waybill issuing system terminal 270 provides to the confidential delivery waybill issuing system, is characterized in that it includes at least one of a name, telephone number, or address.

The created virtual personal information, which is a value that is arbitrarily created by the confidential delivery waybill issuing system 200, means virtual information having numbers, letters, or a combination of numbers and letters, rather than the actual personal information of the customer.

For example, the virtual personal information may be "1234", "our home", or "KCB1234".

In addition, when receiving the actual personal information of the customer through the customer terminal 100 or through the confidential delivery waybill issuing system terminal 270, in the case in which the customer provides a specific value to be used as the virtual personal information, the confidential delivery waybill issuing system 200 creates the specific value, provided by the customer, as the virtual personal information.

For example, in the case in which actual address information, included in the actual personal information of the customer, is "1 Cheongwadae-ro, Jongno-gu, Seoul, Korea", and in the case in which the specific value "Cheongwadae" is input at the time of providing the actual personal information in order to use "Cheongwadae" as the virtual personal information corresponding thereto, the confidential delivery waybill issuing system creates "Cheongwadae" as the virtual personal information corresponding to the actual address information of the customer.

The created virtual personal information is stored and managed in the confidential delivery waybill issuing system together with the actual personal information of the customer in the form of a matching table.

For example, the virtual personal information and the actual personal information of the customer are stored and managed in the form of a matching table, like "Cheongwadae—1 Cheongwadae-ro, Jongno-gu, Seoul, Korea".

In addition, the confidential delivery waybill issuing system 200 is requested to register an online shopping mall access account of the primary merchandise supply company from the primary merchandise supply company system, and is requested to register the secondary to Nth-order merchandise supply companies, which are the subordinate merchandise supply companies of the primary merchandise supply company system, as the access account of the primary merchandise supply company from the primary merchandise supply company system.

Upon receiving the request, the confidential delivery waybill issuing system 200 forms and stores the relationship information between the access account and the merchandise supply company.

For example, it is assumed that the online shopping mall access account of the primary merchandise supply company system 400 registered at the online shopping mall system is A.

In this case, when the registration is performed, the relationship information "A—primary merchandise supply company, secondary to Nth-order merchandise supply companies" is stored and managed in the confidential delivery waybill issuing system.

The stored relationship information between the access account and the merchandise supply company is used as confirmation information necessary to determine whether to create delivery waybill output information, a description of which will follow.

In addition, the confidential delivery waybill issuing system 200 may receive the customer order information and the access account information of the primary merchandise supply company system registered at the online shopping mall system from the online shopping mall system, and may also receive order status information from the online shopping mall system.

The customer order information, which the confidential delivery waybill issuing system 200 receives from the online shopping mall system, includes at least the virtual personal information and the customer order number.

That is, the online shopping mall system provides the customer order information including the virtual personal information and the customer order number to the confidential delivery waybill issuing system 200, and provides the customer order information with the virtual personal information removed to the primary merchandise supply company system 400.

The access account information of the primary merchandise supply company system, the customer order information including the virtual personal information and the customer order number, and the order status information, which are received by the confidential delivery waybill issuing system 200, are stored and managed in the storage means of the confidential delivery waybill issuing system.

The access account information is access account information registered at the online shopping mall system in order for the primary merchandise supply company system to access the online shopping mall system, and the customer order information is information created by the online shopping mall system according to the order of the customer, and includes the virtual personal information and the customer order number. The customer order number is information included in the customer order information created according to the order of the customer, and is the number that the online shopping mall system gives for each order for the purpose of managing merchandise orders. The order status information is information indicating whether the order is a normal order, a return order, an exchange order, or a cancel order.

Upon receiving the request for outputting the delivery waybill from the merchandise supply company system (the primary merchandise supply company system or any one of the secondary to Nth-order merchandise supply company systems), the confidential delivery waybill issuing system 200 confirms the online shopping mall access account information of the primary merchandise supply company system, the customer order number, and the order status information in order to determine whether to create delivery waybill output information. In addition, the confidential delivery waybill issuing system may confirm collection information.

When at least one of the case in which the online shopping mall access account information of the primary merchandise supply company system is not confirmed, the case in which the customer order number is not confirmed, the case in which the order status information indicates a cancel order, or the case in which collection information exists occurs, the delivery waybill output information is not created.

First, the process of confirming the access account information of the primary merchandise supply company system will be described.

The confidential delivery waybill issuing system 200 confirms whether the access account of the primary merchandise supply company system (which is the account necessary to access the online shopping mall system), received from the online shopping mall system, is the access account stored in the storage means.

At the time of receiving the request for registering the access account information from the primary merchandise supply company system, the confidential delivery waybill issuing system 200 receives the access account information of the primary merchandise supply company system in advance, and stores and manages the access account information in the storage means.

Subsequently, the confidential delivery waybill issuing system confirms whether the access account information received from the online shopping mall system is the access account information stored and managed in the storage means thereof.

The reason for this is that this is necessary to confirm whether the merchandise supply company requesting to output the delivery waybill is a normal merchandise supply company system. That is, the reason for this is that, in the case in which the merchandise supply company requesting to output the delivery waybill is a normal merchandise supply company system, the same access account as the access account registered at the online shopping mall must be provided to the confidential delivery waybill issuing system.

In the case in which the same access account is not confirmed, the merchandise supply company requesting to output the delivery waybill is determined to be an abnormal merchandise supply company system, and the delivery waybill output information is not created.

Next, the process of confirming the customer order number will be described.

The customer order number is extracted from the shipping information, acquired from the merchandise supply company system (the primary merchandise supply company system or any one of the secondary to Nth-order merchandise supply company systems), and the extracted customer order number is compared with the customer order numbers stored in the storage means in order to confirm whether the same customer order number exists.

In this case, the confidential delivery waybill issuing system 200 receives the customer order information including the customer order number from the online shopping mall system in advance (see S1008 in FIG. 3), and stores and manages the received customer order information in the storage means.

That is, the confidential delivery waybill issuing system confirms whether the customer order number included in the customer order information, received from the online shopping mall system, is the same as the customer order number extracted from the shipping information, acquired from the merchandise supply company system (the primary merchandise supply company system or any one of the secondary to Nth-order merchandise supply company systems).

In the case in which the same customer order number is not confirmed, the merchandise order is determined to be an abnormal merchandise order, and the delivery waybill output information is not created.

That is, even in the case in which the same access account information is confirmed and the normal merchandise supply company requests to output the delivery waybill, if the same customer order number is not confirmed, the delivery waybill is requested to be output based on an abnormal merchandise order, and therefore the delivery waybill output information is not created.

Next, the process of confirming the order status information will be described.

The confidential delivery waybill issuing system 200 confirms whether the order status information, received from the online shopping mall system, indicates a cancel order. The reason for this is that the delivery waybill output information must be created in the case of a normal order, a return order, or an exchange order and that the delivery waybill output information does not need to be created in the case of a cancel order.

That is, upon confirming that the order status information is a normal order, a return order, or an exchange order, the delivery waybill output information is created, and upon confirming that the order status information indicates a cancel order, the delivery waybill output information is not created.

Next, the process of confirming the collection information will be described.

The confidential delivery waybill issuing system 200 confirms whether the collection information received from the logistics company system exists. The reason for this is that, in the case in which collection information exists, which means that shipping has already been performed, it is not necessary to create delivery waybill output information.

When the same access account of the primary merchandise supply company system and the customer order number are confirmed, the order is confirmed not to be a cancel order, the collection information is confirmed not to exist, and the confidential delivery waybill issuing system 200 creates the delivery waybill output information for the merchandise order for which output of the delivery waybill is requested.

To this end, the confidential delivery waybill issuing system 200 confirms the virtual personal information related to the merchandise order for which output of the delivery waybill is requested. The confidential delivery waybill issuing system extracts the actual personal information of the customer corresponding to the confirmed virtual personal information from the storage means, and combines the extracted actual personal information of the customer, the shipping information, acquired from the merchandise supply company system, and the logistics delivery information, acquired from the logistics company system in order to create delivery waybill output information.

First, the process of confirming the virtual personal information related to the merchandise order for which output of the delivery waybill is requested will be described.

Figure 3:
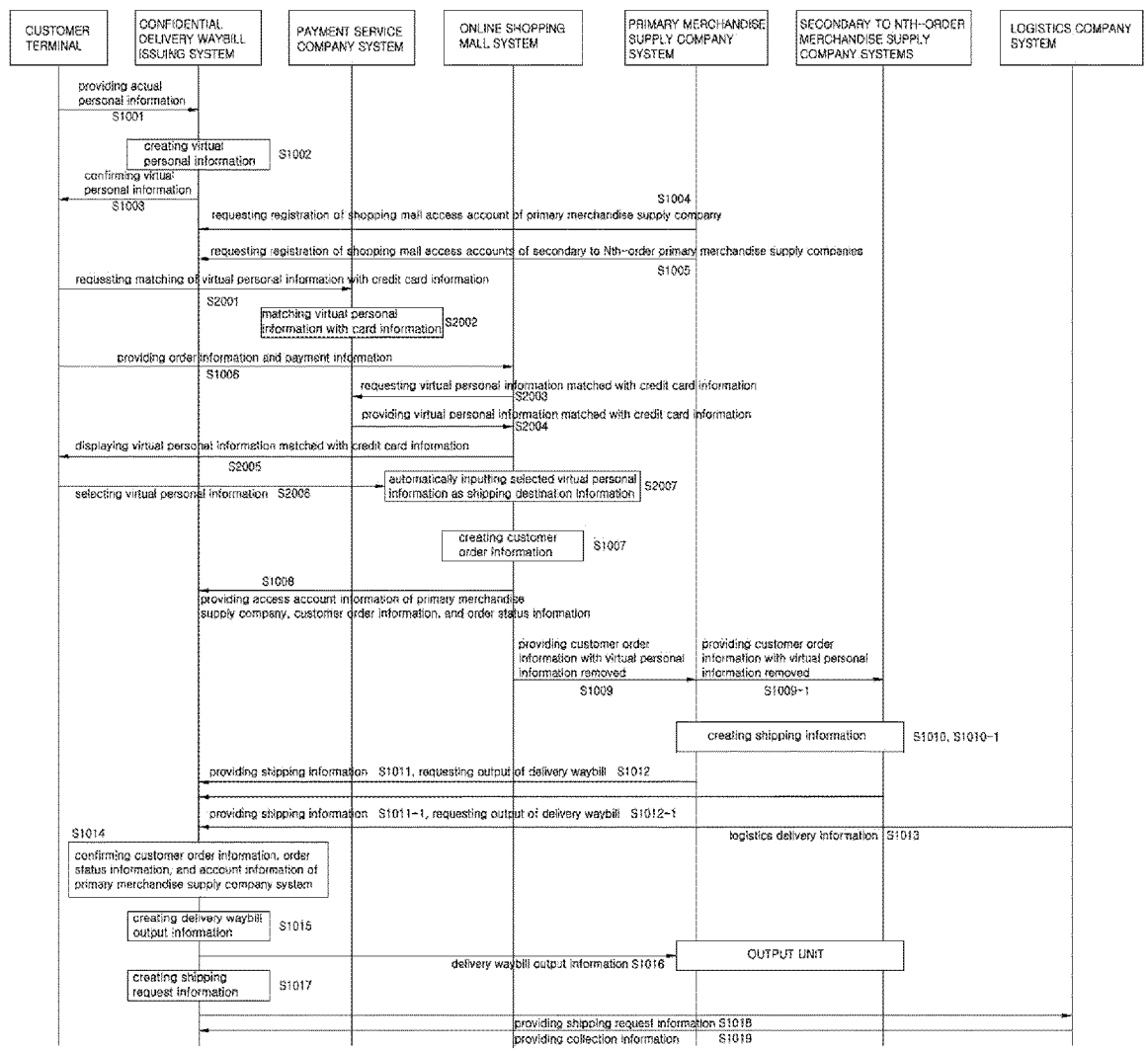
FIG. 3 is a flowchart showing a method of confidentially issuing and managing a delivery waybill using virtual personal information matched with credit card information according to an embodiment of the present invention.

The customer order information, received from the online shopping mall system 300 at step S1008 in FIG. 3, includes the virtual personal information and the customer order number.

The shipping information, received from the merchandise supply company system, also includes the customer order number.

In the case in which the customer order number received from the online shopping mall system 300 and the customer order number included in the shipping information are the same, the confidential delivery waybill issuing system 200 determines that the customer order number is a normal customer order number, and confirms the virtual personal information included in the customer order information, received from the online shopping mall system 300, to be the virtual personal information related to the merchandise order for which output of the delivery waybill is requested.

Next, the process of extracting the actual personal information of the customer corresponding to the confirmed virtual personal information from the storage means will be described in detail.

The confidential delivery waybill issuing system stores and manages, in the storage means, matching table information including the virtual personal information and the actual personal information of the customer matched with each other in the form of a matching table, and the actual personal information of the customer is extracted and acquired from the matching table information (the information including the virtual personal information and the actual personal information of the customer that are matched with each other) stored in the storage means.

For example, in the case in which the storage means stores and manages the matching table information "Cheongwadae—1 Cheongwadae-ro, Jongno-gu, Seoul, Korea" and the virtual personal information included in the customer order information is "Cheongwadae", the confidential delivery waybill issuing system extracts "1 Cheongwadae-ro, Jongno-gu, Seoul, Korea", which is the actual personal information matched with "Cheongwadae", so as to be used to create delivery waybill output information.

Consequently, the confidential delivery waybill issuing system uses a combination of the actual personal information of the customer, extracted and acquired using the matching table information (the information including the virtual personal information and the actual personal information of the customer that are matched with each other in the form of a matching table) stored in the storage means, the shipping information, received from the merchandise supply company system, and the logistics delivery information, received from the logistics company system, in order to create delivery waybill output information including the actual personal information of the customer.

The created delivery waybill output information is directly transmitted to an output unit of the merchandise supply company system requesting to output the delivery waybill (the primary merchandise supply company system or any one of the secondary to Nth-order merchandise supply company systems) so as to be output, whereby the delivery waybill output information including the actual personal information of the customer is neither stored nor managed in the merchandise supply company system.

In addition, the confidential delivery waybill issuing system 200 creates shipping request information using the delivery waybill output information. The created shipping request information is provided to a relevant logistics company system.

Here, the relevant logistics company system means a logistics company for shipping the ordered merchandise. The relevant logistics company system may be known from the logistics company information included in the delivery waybill output information. Described specifically, the delivery waybill output information is created by combining the shipping information, the logistics delivery information, and the actual personal information of the customer. Since the logistics company information is included in the shipping information, it is possible to obtain the relevant logistics company system information from the delivery waybill output information.

In addition, the provision of the shipping request information to the relevant logistics company system means the request for shipping the ordered merchandise.

Upon receiving the shipping request information, the logistics company system 600 provides collection information to the confidential delivery waybill issuing system 200. The collection information is information indicating whether the ordered merchandise has been collected.

The collection information, which the logistics company system 600 provides to the confidential delivery waybill issuing system 200, is utilized as basic information necessary to determine whether to create the delivery waybill output information described above.

As is apparent from the above description, the actual personal information of the customer is stored and managed only in the confidential delivery waybill issuing system, and is neither stored nor managed in the online shopping mall system or in the merchandise supply company system. Consequently, it is possible to solve the conventional problem in which the actual personal information of the customer is stored and managed in the online shopping mall system and in the merchandise supply company system in order to output the delivery waybill, which leads to the leakage of the actual personal information of the customer.

In addition, the confidential delivery waybill issuing system 200 determines whether to create the delivery waybill output information using the online shopping mall access account information of the primary merchandise supply company system, the customer order number, and the order status information, received from the online shopping mall system, whereby it is possible to prevent illegal issuance of the delivery waybill output information.

FIG. 3 is a flowchart generally showing a method of confidentially issuing and managing a delivery waybill using virtual personal information matched with credit card information. A method of confidentially issuing and managing a delivery waybill using virtual personal information matched with credit card information according to an embodiment of the present invention is characterized in that it includes:

a customer terminal 100 or a confidential delivery waybill issuing system terminal 270 providing actual personal information of a customer to a confidential delivery waybill issuing system (S1001);

the confidential delivery waybill issuing system creating virtual personal information corresponding to the actual personal information of the customer, received from the customer terminal or from the confidential delivery waybill issuing system terminal 270, the virtual personal information not being actual personal information (S1002);

a primary merchandise supply company system 400 registering online shopping mall system access account information thereof at the confidential delivery waybill issuing system 200 (S1004);

the customer terminal 100 requesting a payment service company system 700 to match the virtual personal information with credit card information of the customer (S2001);

the payment service company system 700 matching the virtual personal information with the credit card information of the customer (S2002);

the customer terminal 100 providing order information for purchasing merchandise and payment information to an online shopping mall system (S1006);

the online shopping mall system 300 requesting the virtual personal information matched with the credit card information from the payment service company system 700 (S2003);

the payment service company system 700 providing the requested virtual personal information matched with the credit card information to the online shopping mall system 300 (S2004);

the online shopping mall system 300 displaying the virtual personal information matched with the credit card information on the customer terminal 100 (S2005);

the customer terminal 100 selecting any one piece of the displayed virtual personal information (S2006);

the online shopping mall system 300 automatically inputting the virtual personal information selected at step S2006 as shipping destination information (S2007);

the online shopping mall system 300 creating customer order information including a customer order number and the virtual personal information based on the order information, received from the customer terminal, and the virtual personal information automatically input at step S2007 (S1007);

the online shopping mall system providing the customer order information including the customer order number and the virtual personal information and access account information of the primary merchandise supply company system registered at the online shopping mall system to the confidential delivery waybill issuing system (S1008);

the online shopping mall system providing the customer order information with the virtual personal information removed to the primary merchandise supply company system (S1009);

the primary merchandise supply company system creating shipping information including the customer order number and logistics company information based on the customer order information with the virtual personal information removed, received from the online shopping mall system (S1010);

the primary merchandise supply company system providing the created shipping information to the confidential delivery waybill issuing system (S1011);

the primary merchandise supply company system requesting the confidential delivery waybill issuing system to output a delivery waybill corresponding to the shipping information (S1012);

the confidential delivery waybill issuing system receiving logistics delivery information from a logistics company system (S1013);

the confidential delivery waybill issuing system confirming whether the same access account as the access account of the primary merchandise supply company system, acquired from the online shopping mall system, exists in the confidential delivery waybill issuing system and whether the same customer order number as the customer order number included in the shipping information, acquired from the primary merchandise supply company system, exists in the confidential delivery waybill issuing system (an information confirming step) (S1014);

upon confirming at the information confirming step (S1014) that the same customer order number exists and the same access account exists, the confidential delivery waybill issuing system extracting the actual personal information of the customer corresponding to the virtual personal information included in the customer order information, received from the online shopping mall system, from a storage means and combining the extracted actual personal information of the customer, the shipping information, received from the primary merchandise supply company system, and the logistics delivery information, received from the logistics company system, to create delivery waybill output information (S1015);

the confidential delivery waybill issuing system transmitting the created delivery waybill output information to an output unit of the primary merchandise supply company system requesting to output the delivery waybill (S1016);

the confidential delivery waybill issuing system 200 creating shipping request information using the delivery waybill output information (S1017); and the confidential delivery waybill issuing system 200 providing the created shipping request information to the logistics company system (S1018).

In addition, at step S1008, order status information may be further provided.

In this case, the information confirming step (S1014) may further include a process of confirming whether the order status information indicates a cancel order. Upon confirming that the customer order number exists, the same access account exists, and the order status information does not indicate a cancel order, the actual personal information of the customer is extracted from the storage means at the step of creating the delivery waybill output information (S1015).

In addition, the information confirming step (S1014) may further include a process of confirming whether collection information exists. In this case, upon confirming that the customer order number exists, the same access account exists, the order status information does not indicate a cancel order, and no collection information exists, the actual personal information of the customer is extracted from the storage means at the step of creating the delivery waybill output information (S1015).

A method of confidentially issuing and managing a delivery waybill using virtual personal information matched with credit card information according to another embodiment of the present invention is characterized in that it includes:

a customer terminal 100 or a confidential delivery waybill issuing system terminal 270 providing actual personal information of a customer to a confidential delivery waybill issuing system (S1001);

the confidential delivery waybill issuing system 200 creating virtual personal information corresponding to the actual personal information of the customer, received from the customer terminal 100 or from the confidential delivery waybill issuing system terminal 270, the virtual personal information not being actual personal information (S1002);

the customer terminal 100 confirming the created virtual personal information (S1003);

a primary merchandise supply company system 400 requesting the confidential delivery waybill issuing system 200 to register an online shopping mall access account thereof (S1004);

the primary merchandise supply company system 400 requesting the confidential delivery waybill issuing system 200 to register secondary to Nth-order merchandise supply companies, which are subordinate merchandise supply companies thereof, as the online shopping mall access account thereof (S1005);

the customer terminal 100 requesting a payment service company system 700 to match the virtual personal information with credit card information of the customer (S2001);

the payment service company system 700 matching the virtual personal information with the credit card information of the customer (S2002);

the customer terminal 100 providing order information for purchasing merchandise and payment information to an online shopping mall system (S1006);

the online shopping mall system 300 requesting the virtual personal information matched with the credit card information from the payment service company system 700 (S2003);

the payment service company system 700 providing the requested virtual personal information matched with the credit card information to the online shopping mall system 300 (S2004);

the online shopping mall system 300 displaying the virtual personal information matched with the credit card information on the customer terminal 100 (S2005);

the customer terminal 100 selecting any one piece of the displayed virtual personal information (S2006);

the online shopping mall system 300 automatically inputting the virtual personal information selected at step S2006 as shipping destination information (S2007);

the online shopping mall system 300 creating customer order information including a customer order number and the virtual personal information based on the order information, received from the customer terminal, and the virtual personal information automatically input at step S2007 (S1007);

the online shopping mall system providing the customer order information including the customer order number and the virtual personal information and access account information of the primary merchandise supply company system registered at the online shopping mall system to the confidential delivery waybill issuing system (S1008);

the online shopping mall system providing the customer order information with the virtual personal information removed to the primary merchandise supply company system (S1009);

the primary merchandise supply company system providing the customer order information with the virtual personal information removed, received from the online shopping mall system, to any one of the secondary to Nth-order merchandise supply company systems, which are subordinate merchandise supply company systems thereof (S1009-1);

the any one of the secondary to Nth-order merchandise supply company systems creating shipping information including the customer order number and logistics company information based on the customer order information with the virtual personal information removed (S1010-1);

the any one of the secondary to Nth-order merchandise supply company systems providing the created shipping information to the confidential delivery waybill issuing system (S1011);

the any one of the secondary to Nth-order merchandise supply company systems requesting the confidential delivery waybill issuing system to output a delivery waybill corresponding to the shipping information (S1012);

the confidential delivery waybill issuing system receiving logistics delivery information from a logistics company system (S1013);

the confidential delivery waybill issuing system confirming whether the same access account as the access account of the primary merchandise supply company system, acquired from the online shopping mall system, exists in the confidential delivery waybill issuing system and whether the same customer order number as the customer order number included in the shipping information, acquired from the any one of the secondary to Nth-order merchandise supply company systems, exists in the confidential delivery waybill issuing system (an information confirming step) (S1014);

upon confirming at the information confirming step (S1014) that the same customer order number exists and the same access account exists, the confidential delivery waybill issuing system extracting the actual personal information of the customer corresponding to the virtual personal information included in the customer order information, received from the online shopping mall system, from a storage means and combining the extracted actual personal information of the customer, the shipping information, received from the any one of the secondary to Nth-order merchandise supply company systems, and the logistics delivery information, received from the logistics company system, to create delivery waybill output information (S1015);

the confidential delivery waybill issuing system directly transmitting the created delivery waybill output information to an output unit of the any one of the secondary to Nth-order merchandise supply company systems requesting to output the delivery waybill (S1016);

the confidential delivery waybill issuing system 200 creating shipping request information using the delivery waybill output information (S1017); and the confidential delivery waybill issuing system 200 providing the created shipping request information to the logistics company system (S1018).

In addition, at step S1008, order status information may be further provided.

In this case, the information confirming step (S1014) may further include a process of confirming whether the order status information indicates a cancel order. Upon confirming that the customer order number exists, the same access account exists, and the order status information does not indicate a cancel order, the actual personal information of the customer is extracted from the storage means at the step of creating the delivery waybill output information (S1015).

In addition, the information confirming step (S1014) may further include a process of confirming whether collection information exists. In this case, upon confirming that the customer order number exists, the same access account exists, the order status information does not indicate a cancel order, and no collection information exists, the actual personal information of the customer is extracted from the storage means at the step of creating the delivery waybill output information (S1015).

The method of confidentially issuing and managing the delivery waybill according to the embodiment of the present invention will be described in detail with reference to FIG. 3.

The confidential delivery waybill issuing system 200 may be connected to at least one of the customer terminal 100, the online shopping mall system 300, the merchandise supply company systems 400 and 500, the logistics company system 600, or the payment service company system 700 via an electron data interchange interface (EDI).

In this specification, "online shopping" means customer activities of purchasing merchandise online.

The online shopping may be, for example, Internet shopping, in which customers visit shopping malls established over the Internet using customer terminals, such as computers, in order to purchase merchandise, or home shopping, in which customers purchase merchandise through home shopping broadcasts. The online shopping may also be referred to as Internet shopping, home shopping, cyber shopping, electronic commerce, etc.

First, the customer terminal 100 accesses the confidential delivery waybill issuing system over a network, and provides actual personal information of a customer to the confidential delivery waybill issuing system (S1001).

The customer terminal may be a personal computer, a PDA, a laptop computer, a tablet device, a general telephone, a mobile phone, a smartphone, or a smart TV, which the customer possesses, any of various information processing devices that are capable of transmitting and receiving images, text, data, information, etc. over a network, or other portable devices.

As described above, the actual personal information of the customer is provided to the confidential delivery waybill issuing system through the customer terminal 100 online. Alternatively, the actual personal information of the customer may be provided offline. The case in which the actual personal information of the customer is provided offline means the case in which the customer requests virtual personal information through the submission of a related document and, in response thereto, the actual personal information of the customer is provided to the confidential delivery waybill issuing system through the confidential delivery waybill issuing system terminal 270.

The actual personal information of the customer, which the customer terminal or the confidential delivery waybill issuing system terminal 270 provides to the confidential delivery waybill issuing system, is characterized in that it includes at least one of a name, telephone number, or address.

The virtual personal information, received as the result of providing the actual personal information of the customer to the confidential delivery waybill issuing system through the customer terminal 100 online or as the result of providing the actual personal information of the customer to the confidential delivery waybill issuing system through the confidential delivery waybill issuing system terminal 270 offline, may be confirmed through the customer terminal online or may be confirmed offline (for example, through the mail or a card having virtual personal information recorded therein).

Upon receiving the actual personal information of the customer, the confidential delivery waybill issuing system 200 creates virtual personal information corresponding to the actual personal information of the customer, the virtual personal information not being actual personal information (S1002).

For example, in the case in which actual address information, included in the actual personal information of the customer, is "1 Cheongwadae-ro, Jongno-gu, Seoul, Korea", the virtual personal information created by the confidential delivery waybill issuing system may be "1234", "7777", "kkk", "ggg", "kk1234", etc. The virtual personal information corresponding to the actual personal information of the customer, created by the confidential delivery waybill issuing system, as described above, may be information having numbers, letters, or a combination of numbers and letters.

In addition, the virtual personal information may be arbitrarily created by the confidential delivery waybill issuing system. Alternatively, the virtual personal information may be created using information desired by the customer. To this end, when providing the actual personal information of the customer to the confidential delivery waybill issuing system, the customer may provide a specific value to be used as the virtual personal information to the confidential delivery waybill issuing system.

For example, in the case in which the actual address information is "1 Cheongwadae-ro, Jongno-gu, Seoul, Korea", and in the case in which the specific value "Cheongwadae" is input at the time of providing the actual personal information in order to use "Cheongwadae" as the virtual personal information in response thereto, the confidential delivery waybill issuing system creates "Cheongwadae" as the virtual personal information corresponding to the actual address information of the customer.

In the above description, the address was used as the virtual personal information by way of example. Alternatively, the name or the telephone number of the customer may be used as the virtual personal information. In the case in which the name or the telephone number of the customer is used as the virtual personal information, the customer provides his/her virtual personal information (name or telephone number) to the confidential delivery waybill issuing system and receives virtual personal information corresponding thereto from the confidential delivery waybill issuing system, in the same manner as in the case of the address.

The created virtual personal information is stored and managed in the confidential delivery waybill issuing system together with the actual personal information of the customer in the form of a matching table.

For example, matching information is stored and managed in the form of a matching table, like actual personal information ("Cheongwadae—1 Cheongwadae-ro, Jongno-gu, Seoul, Korea")—virtual personal information ("Cheongwadae") and actual personal information ("010-6606-****")—virtual personal information ("7777").

The confidential delivery waybill issuing system may provide all or some of the matching information about the actual personal information of the customer and the virtual personal information, matched with each other, to the online shopping mall system.

In the above description, the actual personal information of the customer may be at least one of a name, telephone number, or address.

In addition, the customer terminal may confirm the created virtual personal information corresponding to the actual personal information of the customer through the confidential delivery waybill issuing system (S1003).

The primary merchandise supply company system 400 registers and uses an access account in order to access the online shopping mall system.

The primary merchandise supply company system 400 requests the confidential delivery waybill issuing system to register the online shopping mall access account thereof, which has been registered at the online shopping mall system (S1004).

In addition, the primary merchandise supply company system 400 requests the confidential delivery waybill issuing system 200 to register secondary to Nth-order merchandise supply companies, which are subordinate merchandise supply companies thereof, as the online shopping mall access account thereof (S1005).

Upon receiving the request from the primary merchandise supply company system 400, the confidential delivery waybill issuing system 200 forms and stores relationship information between the access account and the merchandise supply company.

For example, it is assumed that the online shopping mall access account of the primary merchandise supply company system 400 registered at the online shopping mall system is A.

In this case, when registration is performed, the relationship information "A—primary merchandise supply company, secondary to Nth-order merchandise supply companies" is stored and managed in the confidential delivery waybill issuing system.

The stored relationship information between the access account and the merchandise supply company is used as confirmation information necessary to determine whether to create delivery waybill output information, a description of which will follow.

That is, the registered access account information and the merchandise supply company are stored and managed in the confidential delivery waybill issuing system in the form of a matching table. That is, the registered access account information and the merchandise supply company are stored and managed in the confidential delivery waybill issuing system in the form "access account—merchandise supply company".

The customer terminal 100 requests the payment service company system 700 to match the virtual personal information, received from the confidential delivery waybill issuing system 200, with credit card information of the customer (S2001).

The payment service company system 700 may be a general credit card company system or a company system that runs a simple payment service system. In the present invention, the payment service company system is not limited to a credit card company system or to a company system that runs the simple payment service system, but may include any system capable of managing a payment service.

The payment service company system 700 matches the virtual personal information with the credit card information of the customer (S2002). That is, upon receiving the request from the customer, the payment service company system 700 matches the requested virtual personal information with the credit card information of the customer. At this time, at least one piece of virtual personal information may be matched with the credit card information of the customer.

The payment service company system 700 stores and manages the credit card information of the customer and the virtual personal information in the form of a matching table for each customer, and when the online shopping mall system requests virtual personal information matched with specific credit card information, the payment service company system provides the requested virtual personal information to the online shopping mall system.

The customer terminal 100 provides order information for purchasing merchandise and payment information to the online shopping mall system (S1006).

The order information for purchasing merchandise is information about a merchandise order that does not include the actual personal information of the customer, and the payment information is price payment information for the ordered merchandise, such as general credit card information, preferably a credit card number.

When credit card information is input as the payment information, the online shopping mall system 300 requests virtual personal information matched with the input credit card information from the payment service company system 700 (S2003).

The payment service company system 700 provides the requested virtual personal information matched with the credit card information to the online shopping mall system 300 (S2004).

Upon receiving the virtual personal information from the payment service company system 700, the online shopping mall system 300 displays the virtual personal information matched with the credit card information on the customer terminal 100 (S2005).

Subsequently, the customer terminal 100 selects any one piece of the displayed virtual personal information (S2006).

That is, the customer provides the payment information to the online shopping mall system through the customer terminal 100. The payment information of the customer may be a credit card number. When the credit card number is input as the payment information, the online shopping mall system requests virtual personal information matched with the input credit card information from the payment service company system, and upon receiving the request, the payment service company system provides the virtual personal information matched with the credit card information to the online shopping mall system.

One or more pieces of virtual personal information may be matched with the credit card information. This depends on the number of pieces of virtual personal information that the customer requests the payment service company system to match with his/her credit card information.

Upon receiving the virtual personal information matched with the credit card information from the payment service company system, the online shopping mall system displays the received virtual personal information on the customer terminal such that the customer terminal can select the virtual personal information.

For example, in the case in which a plurality of pieces of virtual personal information is matched with the credit card information, the plurality of pieces of virtual personal information is displayed on the customer terminal in the form of a popup window, and when the customer selects one from among the plurality of pieces of virtual personal information, the selected virtual personal information is automatically input as shipping destination information (S2007).

Even in the case in which only one piece of virtual personal information is matched with the credit card information, the process is executed in the same manner as set forth above. That is, one piece of virtual personal information is provided to the customer terminal in the form of a popup window, and when the customer selects the provided virtual personal information, the selected virtual personal information is automatically input as the shipping destination information (S2007).

The virtual personal information, selected and automatically input in the above process, is used as a basis for creating customer order information, a description of which will follow.

Shipping destination information is input to the online shopping mall system, in addition to the order information for purchasing merchandise and the payment information. In the present invention, the virtual personal information, rather than the actual personal information of the customer, is input as the shipping destination information, as described above. The customer does not need to directly input the virtual personal information. When the credit card information of the customer is input as the payment information, the virtual personal information matched with the credit card information of the customer is automatically input into the shipping destination input window. 273[ ] The online shopping mall system 300 creates customer order information based on the order information, received from the customer terminal 100, and the automatically input virtual personal information (S1007).

The created customer order information includes a customer order number and the virtual personal information.

Here, the "customer order number" means management number created by the online shopping mall system in order to manage the order when the order is completed.

The online shopping mall system provides the customer order information including the customer order number and the virtual personal information and access account information of the primary merchandise supply company system registered at the online shopping mall system to the confidential delivery waybill issuing system (S1008).

At this time, the online shopping mall system may further provide order status information to the confidential delivery waybill issuing system.

Here, the online shopping mall system may transmit the customer order information, the access account information, and the order status information to the confidential delivery waybill issuing system over an online network or via facsimile, e-mail, message, or wired or wireless telephone.

The access account information of the primary merchandise supply company system, the customer order information, and the order status information, which are received by the confidential delivery waybill issuing system 200, are stored and managed in the storage means, which is provided in the confidential delivery waybill issuing system 200.

The access account information is access account information registered at the online shopping mall system in order for the primary merchandise supply company system to access the online shopping mall system, and the customer order information is information created by the online shopping mall system according to the order of the customer, and includes the customer order number and the virtual personal information. The order status information is information indicating whether the order is a normal order, a return order, an exchange order, or a cancel order.

In addition, the online shopping mall system provides the created customer order information with the virtual personal information removed to the primary merchandise supply company system (S1009).

Here, the online shopping mall system may transmit the customer order information with the virtual personal information removed to the primary merchandise supply company system via facsimile, e-mail, message, or wired or wireless telephone, or over an online network. The primary merchandise supply company system may access the online shopping mall system in order to download the customer order information.

Since the customer order information with the virtual personal information removed, provided to the primary merchandise supply company system, includes neither the virtual personal information nor the actual personal information of the customer (recipient), the virtual personal information and the actual personal information of the customer do not exist in the primary merchandise supply company system. Consequently, it is possible to fundamentally prevent the leakage of the actual personal information of the customer (recipient) as the result of hacking the primary merchandise supply company system.

In the case in which the primary merchandise supply company does not supply the merchandise but any one of the secondary to Nth-order merchandise supply companies, which are its subordinate merchandise supply companies, supplies the merchandise, the primary merchandise supply company system provides the customer order information with the virtual personal information removed, received from the online shopping mall system, to any one of the secondary to Nth-order merchandise supply company systems (S1009-1).

Upon receiving the customer order information with the virtual personal information removed, the merchandise supply company system (the primary merchandise supply company system or any one of the secondary to Nth-order merchandise supply company systems) creates shipping information based on the acquired customer order information (information including no virtual personal information) (S1010, S1010-1), and the merchandise supply company system (the primary merchandise supply company system or any one of the secondary to Nth-order merchandise supply company systems) accesses the confidential delivery waybill issuing system in order to provide the created shipping information to the confidential delivery waybill issuing system (S1011, S1011-1).

Since the shipping information is created using the customer order information with the virtual personal information removed, provided by the online shopping mall system, the shipping information does not include the virtual personal information or the actual personal information of the customer but includes the customer order number.

In addition, the shipping information may include logistics company information, an online shopping mall name, access account information, the collection due date of the ordered merchandise, the name of the ordered merchandise, the quantity of the ordered merchandise, the price of the ordered merchandise, the quantity of packaging boxes for packaging the ordered merchandise, the kind of packaging boxes, a shipping charge, and a shipping message.

The access account information included in the shipping information is "online shopping mall access account information of the primary merchandise supply company" necessary for the primary merchandise supply company system 400 to access the online shopping mall system.

In addition, the merchandise supply company system (the primary merchandise supply company system or any one of the secondary to Nth-order merchandise supply company systems) requests the confidential delivery waybill issuing system to output a delivery waybill necessary for shipping in response to the created shipping information (S1012, S1012-1).

Since the shipping information, which the merchandise supply company system (the primary merchandise supply company system or any one of the secondary to Nth-order merchandise supply company systems) provides to the confidential delivery waybill issuing system, includes neither the virtual personal information nor the actual personal information of the customer (recipient), it is not possible to ship the merchandise to the destination desired by the customer using only the shipping information. Consequently, it is necessary to perform a procedure of displaying the actual personal information of the customer (recipient) on the delivery waybill. This procedure will be described in detail in the process of creating delivery waybill output information, a description of which will follow.

The confidential delivery waybill issuing system 200 receives logistics delivery information from the logistics company system (S1013).

The logistics delivery information may include a collection point code, a collection point name, a collection date, a destination terminal code, a destination terminal name, and a delivery waybill number, which are provided by each logistics company and are necessary to output the delivery waybill.

Upon receiving the request for outputting the delivery waybill from the merchandise supply company system (the primary merchandise supply company system or any one of the secondary to Nth-order merchandise supply company systems), the confidential delivery waybill issuing system 200 confirms the online shopping mall access account information of the primary merchandise supply company system and the customer order number in order to determine whether to create delivery waybill output information. In addition, the confidential delivery waybill issuing system may confirm collection information (S1014).

At this time, the confidential delivery waybill issuing system 200 may also confirm the order status information in order to determine whether to create delivery waybill output information, in addition to the online shopping mall access account information of the primary merchandise supply company system and the customer order number.

In addition, the confidential delivery waybill issuing system 200 may also confirm the collection information in order to determine whether to create delivery waybill output information, in addition to the online shopping mall access account information of the primary merchandise supply company system, the customer order number, and the order status information.

When at least one of the case in which the same online shopping mall access account information of the primary merchandise supply company system is not confirmed, the case in which the same customer order number is not confirmed, the case in which the order status information indicates a cancel order, or the case in which collection information exists occurs, the delivery waybill output information is not created.

First, the process of confirming the online shopping mall access account information of the primary merchandise supply company system will be described.

The confidential delivery waybill issuing system confirms whether the access account of the primary merchandise supply company system (received at step S1008 in FIG. 3), received from the online shopping mall system, is the access account stored in the storage means.

The primary merchandise supply company system registers the online shopping mall system access account information thereof at the confidential delivery waybill issuing system in advance (see S1004 in FIG. 3), and then the confidential delivery waybill issuing system stores and manages the access account information in the storage means. The reason for this is that it is necessary for the confidential delivery waybill issuing system to confirm whether the online shopping mall access account information of the primary merchandise supply company system, received from the online shopping mall system, is the same as the access account information stored and managed in the storage means thereof.

The reason for this is that this is necessary to confirm whether the primary merchandise supply company system is a normal merchandise supply company system. That is, the reason for this is that, in the case in which the primary merchandise supply company system is a normal merchandise supply company system, the same access account as the access account registered at the online shopping mall must be provided to the confidential delivery waybill issuing system at step S1004 in FIG. 3.

In the case in which the same online shopping mall access account information of the primary merchandise supply company is not confirmed, the delivery waybill output information is not created.

Next, the process of confirming the customer order number will be described.

The confidential delivery waybill issuing system 200 extracts the customer order number from the shipping information, acquired from the merchandise supply company system (the primary merchandise supply company system or any one of the secondary to Nth-order merchandise supply company systems), and compares the extracted customer order number with the customer order numbers stored in the storage means in order to confirm whether the same customer order number exists.

In this case, the confidential delivery waybill issuing system 200 receives the customer order information including the customer order number from the online shopping mall system in advance (see S1008 in FIG. 3), and stores and manages the received customer order information in the storage means.

That is, the confidential delivery waybill issuing system confirms whether the customer order number included in the customer order information, received from the online shopping mall system, is the same as the customer order number extracted from the shipping information, acquired from the merchandise supply company system (the primary merchandise supply company system or any one of the secondary to Nth-order merchandise supply company systems).

In the case in which the same customer order number is not confirmed, the merchandise order is determined to be an abnormal merchandise order, and the delivery waybill output information is not created.

That is, even in the case in which the same access account information described above is confirmed and the normal merchandise supply company requests to output the delivery waybill, if the same customer order number is not confirmed, the delivery waybill is requested to be output based on an abnormal merchandise order, and therefore the delivery waybill output information is not created.

The process of confirming the order status information will be described.

The confidential delivery waybill issuing system 200 confirms whether the order status information, received from the online shopping mall system, indicates a cancel order. The order status information may indicate a normal order, a return order, or an exchange order, in addition to the cancel order.

The reason for this is that the delivery waybill output information must be created in the case of a normal order, a return order, or an exchange order and that the delivery waybill output information does not need to be created in the case of a cancel order.

That is, upon confirming that the order status information is a normal order, a return order, or an exchange order, the delivery waybill output information is created, and upon confirming that the order status information indicates a cancel order, the delivery waybill output information is not created.

Consequently, when at least one of the case in which the online shopping mall access account information of the primary merchandise supply company system is not confirmed, the case in which the customer order number is not confirmed, or the case in which the order status information indicates a cancel order occurs, the delivery waybill output information is not created.

That is, the case in which the access account of the primary merchandise supply company system is not confirmed is the case in which an unqualified merchandise supply company requested to output a delivery waybill, the case in which the customer order number is not confirmed is the case in which no customer ordered merchandise through the online shopping mall, and the case in which the order status information indicates a cancel order is the case in which no delivery waybill output information for shipping is necessary, whereby the delivery waybill output information needs not be created.

The process of confirming the collection information will be described.

The confidential delivery waybill issuing system 200 confirms whether the collection information received from the logistics company system exists. The reason for this is that, in the case in which the collection information exists, which means that shipping has already been performed, it is not necessary to create delivery waybill output information.

The reason for confirming the online shopping mall access account information of the primary merchandise supply company system, the customer order number, the order status information, and the collection information before creating the delivery waybill output information, as described above, is that it is necessary to prevent illegal issuance of a delivery waybill, whereby it is possible to confidentially issue and manage a delivery waybill in a safer and more efficient manner.

When the same access account of the primary merchandise supply company system and the customer order number are confirmed, the order is confirmed not to be a cancel order, and the collection information is confirmed not to exist, the confidential delivery waybill issuing system 200 creates delivery waybill output information for the merchandise order requested to output a delivery waybill (S1015).

The process of the confidential delivery waybill issuing system 200 creating the delivery waybill output information will be described in detail.

First, the confidential delivery waybill issuing system 200 confirms virtual personal information related to the merchandise order for which output of the delivery waybill is requested. The confidential delivery waybill issuing system extracts the actual personal information of the customer corresponding to the confirmed virtual personal information from the storage means, and combines the extracted actual personal information of the customer, the shipping information, acquired from the merchandise supply company system, and the logistics delivery information, acquired from the logistics company system in order to create delivery waybill output information.

First, the process of confirming the virtual personal information related to the merchandise order for which output of the delivery waybill is requested will be described.

The customer order information, received from the online shopping mall system 300 at step S1008 in FIG. 3, includes the virtual personal information and the customer order number.

The shipping information, received from the merchandise supply company system, also includes the customer order number.

In the case in which the customer order number received from the online shopping mall system 300 and the customer order number included in the shipping information are the same, the confidential delivery waybill issuing system 200 determines that the customer order number is a normal customer order number, and confirms the virtual personal information included in the customer order information, received from the online shopping mall system 300, to be the virtual personal information related to the merchandise order for which output of the delivery waybill is requested.

The process of extracting the actual personal information of the customer corresponding to the virtual personal information from the storage means will be described in detail.

The confidential delivery waybill issuing system stores and manages, in the storage means, matching table information including the virtual personal information and the actual personal information of the customer matched with each other in the form of a matching table, and the actual personal information of the customer is extracted and acquired from the matching table information (the information including the virtual personal information and the actual personal information of the customer that are matched with each other) stored in the storage means.

For example, in the case in which the storage means stores and manages the matching table information "Cheongwadae—1 Cheongwadae-ro, Jongno-gu, Seoul, Korea" and the virtual personal information included in the customer order information, received from the online shopping mall system, is "Cheongwadae", the confidential delivery waybill issuing system extracts "1 Cheongwadae-ro, Jongno-gu, Seoul, Korea", which is the actual personal information matched with "Cheongwadae", so as to be used to create delivery waybill output information.

Consequently, the confidential delivery waybill issuing system uses a combination of the actual personal information of the customer, extracted and acquired using the matching table information (the information including the virtual personal information and the actual personal information of the customer that are matched with each other in the form of a matching table) stored in the storage means, the shipping information, received from the merchandise supply company system, and the logistics delivery information, received from the logistics company system, in order to create delivery waybill output information including the actual personal information of the customer (S1013).

The created delivery waybill output information is directly transmitted to an output unit of the merchandise supply company system requesting to output the delivery waybill (the primary merchandise supply company system or any one of the secondary to Nth-order merchandise supply company systems) (S1016). The delivery waybill output information is automatically deleted immediately after being output, whereby the delivery waybill output information including the actual personal information of the customer is neither stored nor managed in the merchandise supply company system.

Here, it should be noted that the delivery waybill output information including the actual personal information of the customer is transmitted to an output unit of the merchandise supply company system, which is connected to an output device, such as a display monitor or a printer.

In the present invention, therefore, the delivery waybill output information including the actual personal information of the customer is transmitted to the output unit of the merchandise supply company system, is immediately output, and is automatically deleted. Consequently, it is not possible for the merchandise supply company to arbitrarily store and manage the delivery waybill output information including the actual personal information of the customer in the system thereof.

That is, the delivery waybill output information including the actual personal information of the customer, created by the confidential delivery waybill issuing system, is neither stored nor managed in the merchandise supply company system, but is directly transmitted to the output unit of the merchandise supply company system so as to be simply output through the output device (for example, a display motor or a printer), whereby the delivery waybill output information including the actual personal information of the customer is neither stored nor managed in the merchandise supply company system. Consequently, it is possible to prevent the leakage of the actual personal information of the customer, which may occur in the case in which the actual personal information of the customer is stored and managed in the merchandise supply company system.

Subsequently, the merchandise supply company attaches the delivery waybill, output in the form of a document, on the ordered merchandise, and the logistics company delivers the merchandise, received from the merchandise supply company, to the customer.

In another embodiment, the confidential delivery waybill issuing system may transmit the delivery waybill output information with the actual personal information of the customer removed to the output unit of the merchandise supply company system, and may transmit the actual personal information of the customer to a logistics worker terminal in response to the request of the logistics worker terminal.

In order to improve safety, the actual personal information of the customer or the transmission section thereof may be encoded when transmitting the delivery waybill output information, whereby it is possible to prevent hacking actual personal information of the customer.

In addition, the confidential delivery waybill issuing system 200 creates shipping request information using the delivery waybill output information (S1017). The created shipping request information is provided to a relevant logistics company system (S1018).

Here, the relevant logistics company system means a logistics company for shipping the ordered merchandise. The relevant logistics company system may be known from the logistics company information included in the delivery waybill output information. Described specifically, the delivery waybill output information is created by combining the shipping information, the logistics delivery information, and the actual personal information of the customer. Since the logistics company information is included in the shipping information, it is possible to obtain the relevant logistics company system information from the delivery waybill output information.

In addition, the provision of the shipping request information to the relevant logistics company system means the request for shipping the ordered merchandise.

Upon receiving the shipping request information, the logistics company system 600 provides collection information to the confidential delivery waybill issuing system 200 (S1019). The collection information is information indicating whether the ordered merchandise has been collected.

Subsequently, the logistics company delivers the collected ordered merchandise.

In the embodiment of the present invention, as described above, in the case in which the online shopping mall system requests virtual personal information matched with credit card information from the payment service company system, the payment service company system provides the virtual personal information matched with the credit card information to the online shopping mall system. In another embodiment of the present invention, the payment service company system may provide token information matched with the virtual personal information to the online shopping mall system, instead of the virtual personal information.

The token information may be information that the payment service company system arbitrarily creates in relation to the requested virtual personal information, and may be information having numbers, letters, or a combination of numbers and letters. The payment service company system stores and manages the virtual personal information and the token information in a matched state as well as the information including the credit card information and the virtual personal information matched with each other.

Also, in the case in which the payment service company system provides the token information to the online shopping mall system, instead of the virtual personal information, the payment service company system provides the information including the virtual personal information and the token information matched with each other to the confidential delivery waybill issuing system.

In the case in which the online shopping mall system 300 receives the token information from the payment service company system, instead of the virtual personal information, the online shopping mall system creates customer order information based on the order information, provided by the customer, and the token information, acquired in the payment information input process. In this case, the created customer order information may include a customer order number and the token information.

As described above, the confidential delivery waybill issuing system 200 may receive the information including the virtual personal information and the token information matched with each other from the payment service company system 700. In the case in which the payment service company system 700 provides the token information to the online shopping mall system 300, instead of the virtual personal information, the confidential delivery waybill issuing system 200 receives the information including the virtual personal information and the token information matched with each other from the payment service company system 700.

The customer order information, which the confidential delivery waybill issuing system 200 receives from the online shopping mall system 300, includes the token information and the customer order number.

The shipping information, received from the merchandise supply company system, also includes the customer order number.

In the case in which the customer order number received from the online shopping mall system 300 and the customer order number included in the shipping information are the same, the confidential delivery waybill issuing system 200 determines that the customer order number is a normal customer order number, and confirms the token information included in the customer order information, received from the online shopping mall system 300, to be normal token information related to the merchandise order for which output of the delivery waybill is requested.

Next, the confidential delivery waybill issuing system confirms what the virtual personal information matched with the confirmed token information is. The confidential delivery waybill issuing system 200 receives the information including the virtual personal information and the token information matched with each other from the payment service company system in advance. Consequently, it is possible for the confidential delivery waybill issuing system to confirm what the virtual personal information matched with the token information is using the information received from the payment service company system.

Subsequently, the confidential delivery waybill issuing system 200 extracts the actual personal information of the customer corresponding to the confirmed virtual personal information from the storage means.

The confidential delivery waybill issuing system stores and manages matching table information including the virtual personal information and the actual personal information of the customer matched with each other in the form of a matching table, and the actual personal information of the customer is extracted and acquired from the matching table information (the information including the virtual personal information and the actual personal information of the customer that are matched with each other) stored in the storage means.

For example, in the case in which the storage means stores and manages the matching table information "Cheongwadae—1 Cheongwadae-ro, Jongno-gu, Seoul, Korea" and the virtual personal information matched with the token information is "Cheongwadae", the confidential delivery waybill issuing system extracts "1 Cheongwadae-ro, Jongno-gu, Seoul, Korea", which is the actual personal information matched with "Cheongwadae", so as to be used to create delivery waybill output information. The processes performed after the delivery waybill output information is created are identical to those described above, and therefore a description thereof will be omitted.

The method of confidentially issuing and managing the delivery waybill using the virtual personal information according to the embodiment of the present invention described above may be programmed so as to be executed in an electronic device, such as a computer.

The embodiments of the present invention described above may be implemented through a system and a method, and may also be implemented through a computer program that is capable of realizing functions corresponding to the components of the embodiments of the present invention or a recording medium having the computer program recorded therein.

The present invention has been shown and described in detail with reference to preferred embodiments thereof. However, it will be appreciated by those skilled in the art that improvements and/or modifications may be made in these embodiments without departing from the principles and spirit of the invention, the scope of which is defined in the appended claims and their equivalents.

INDUSTRIAL APPLICABILITY

According to the present invention, an online shopping customer does not need to input actual personal information as customer information in every online shopping mall providing merchandise that the customer wishes to purchase or for every order, and is capable of ordering and receiving the merchandise using simple virtual personal information, whereby very convenient online shopping is possible.

What is claimed is:

1. A method of confidentially issuing and managing a delivery waybill using virtual personal information matched with credit card information, the method comprising:
   a customer terminal (100) or a confidential delivery waybill issuing system terminal (270) providing actual personal information of a customer to a confidential delivery waybill issuing system (S1001);
   the confidential delivery waybill issuing system creating virtual personal information corresponding to the actual personal information of the customer, received from the customer terminal or from the confidential delivery waybill issuing system terminal (270), the virtual personal information not being actual personal information (S1002);
   a primary merchandise supply company system (400) registering online shopping mall system access account information thereof at the confidential delivery waybill issuing system (200) (S1004);
   the customer terminal (100) requesting a payment service company system (700) to match the virtual personal information with credit card information of the customer (S2001);
   the payment service company system (700) matching the virtual personal information with the credit card information of the customer (S2002);
   the customer terminal (100) providing order information for purchasing merchandise and payment information to an online shopping mall system (S1006);
   the online shopping mall system (300) requesting the virtual personal information matched with the credit card information from the payment service company system (700) (S2003);
   the payment service company system (700) providing the requested virtual personal information matched with the credit card information to the online shopping mall system (300) (S2004);
   the online shopping mall system (300) displaying the virtual personal information matched with the credit card information on the customer terminal (100) (S2005);
   the customer terminal (100) selecting any one piece of the displayed virtual personal information (S2006);
   the online shopping mall system (300) automatically inputting the virtual personal information selected at step S2006 as shipping destination information (S2007);
   the online shopping mall system (300) creating customer order information comprising a customer order number and the virtual personal information based on the order information, received from the customer terminal (100), and the virtual personal information automatically input at step S2007 (S1007);
   the online shopping mall system (300) providing the customer order information comprising the customer order number and the virtual personal information and registered access account information of the primary merchandise supply company system to the confidential delivery waybill issuing system (S1008);
   the online shopping mall system (300) providing the customer order information with the virtual personal information removed to the primary merchandise supply company system (S1009);
   the primary merchandise supply company system creating shipping information comprising the customer order number and logistics company information based on the customer order information with the virtual personal information removed (S1010);
   the primary merchandise supply company system providing the created shipping information to the confidential delivery waybill issuing system (S1011);
   the primary merchandise supply company system requesting the confidential delivery waybill issuing system to output a delivery waybill corresponding to the shipping information (S1012);
   the confidential delivery waybill issuing system receiving logistics delivery information from a logistics company system (S1013);
   the confidential delivery waybill issuing system (200) confirming whether a same access account as the access account of the primary merchandise supply company system, acquired from the online shopping mall system, exists in the confidential delivery waybill issuing system and whether a same customer order number as the customer order number included in the shipping information, acquired from the primary merchandise supply company system, exists in the confidential delivery waybill issuing system (an information confirming step) (S1014);
   upon confirming at the information confirming step (S1014) that the same customer order number exists and the same access account exists, the confidential delivery waybill issuing system extracting the actual personal information of the customer corresponding to the virtual personal information included in the customer order information, received from the online shopping mall system, from a storage means and combining the extracted actual personal information of the customer, the shipping information, received from the primary merchandise supply company system, and the logistics delivery information, received from the logistics company system, to create delivery waybill output information (S1015);

the confidential delivery waybill issuing system directly transmitting the created delivery waybill output information to an output unit of the primary merchandise supply company system requesting to output the delivery waybill (S1016);

the confidential delivery waybill issuing system (200) creating shipping request information using the delivery waybill output information (S1017); and the confidential delivery waybill issuing system (200) providing the created shipping request information to the logistics company system (S1018).

2. The method according to claim 1, wherein the actual personal information of the customer, which the customer terminal (100) or the confidential delivery waybill issuing system terminal (270) provides to the confidential delivery waybill issuing system, comprises at least one of a name, telephone number, or address.

3. The method according to claim 1, wherein the step of the customer terminal (100) providing the order information for purchasing merchandise and the payment information to the online shopping mall system (S1006) further comprises providing orderer information, the orderer information not being actual information but being virtual personal information.

4. The method according to claim 1, wherein, in a case in which a specific value to be used as the virtual personal information is provided at the step of the customer terminal (100) or the confidential delivery waybill issuing system terminal (270) providing the actual personal information of the customer to the confidential delivery waybill issuing system (S1001), the provided specific value is created as the virtual personal information at the step of creating the virtual personal information (S1002).

5. The method according to claim 1, wherein the delivery waybill output information with the actual personal information of the customer removed is transmitted at step (S1016).

6. The method according to claim 5, further comprising the confidential delivery waybill issuing system transmitting the actual personal information of the customer to a logistics worker terminal.

7. The method according to claim 1, wherein the step of the online shopping mall system providing the customer order information with the virtual personal information removed to the primary merchandise supply company system (S1009) comprises the primary merchandise supply company system accessing the online shopping mall system in order to download the customer order information with the virtual personal information removed or the online shopping mall system transmitting the customer order information with the virtual personal information removed to the primary merchandise supply company system online.

8. The method according to claim 1, further comprising the customer terminal (100) confirming the created virtual personal information (S1003).

9. The method according to claim 1, wherein order status information is further provided at the step of the online shopping mall system (300) providing the customer order information comprising the customer order number and the virtual personal information and the registered access account information of the primary merchandise supply company system to the confidential delivery waybill issuing system (S1008), and in a case in which the order status information is further provided, the information confirming step (S1014) comprises confirming whether the order status information indicates a cancel order, and the step of creating the delivery waybill output information (S1015) comprising extracting the actual personal information of the customer from the storage means upon confirming that the customer order number exists, the same access account exists, and the order status information does not indicate a cancel order.

10. The method according to claim 1, further comprising: the logistics company system (600) providing collection information to the confidential delivery waybill issuing system (200) (S1019), wherein the information confirming step (S1014) comprises confirming whether collection information exists, in which case the step of creating the delivery waybill output information (S1015) comprises extracting the actual personal information of the customer from the storage means upon confirming that the customer order number exists, the same access account exists, the order status information does not indicate a cancel order, and no collection information exists.

11. A computer-readable recording medium having a program for performing the method according to claim 1 recorded therein.

12. The method according to claim 1, further comprising the confidential delivery waybill issuing system providing matching information comprising the created virtual personal information and the actual personal information of the customer matched with each other to the online shopping mall system.

13. The method according to claim 1, wherein
at step S2004, the payment service company system (700) provides token information matched with the virtual personal information to the online shopping mall system (300), instead of the requested virtual personal information matched with the credit card information, and in this case, after step S2004, the method comprises:
the online shopping mall system (300) automatically inputting the token information, received at step S2004, as shipping destination information (S2007);

the payment service company system (700) providing information comprising the virtual personal information and the token information matched with each other to the confidential delivery waybill issuing system (200) (S2008);

the online shopping mall system (300) creating customer order information comprising a customer order number and the token information based on the order information, received from the customer terminal, and the token information, automatically input at step S2007 (S1007);

the online shopping mall system (300) providing the customer order information comprising the customer order number and the token information and registered access account information of the primary merchandise supply company system to the confidential delivery waybill issuing system (S1008);

the online shopping mall system (300) providing the customer order information with the token information removed to the primary merchandise supply company system (S1009);

the primary merchandise supply company system creating shipping information comprising the customer order number and logistics company information based on the customer order information with the token information removed (S1010);

the primary merchandise supply company system providing the created shipping information to the confidential delivery waybill issuing system (S1011);

the primary merchandise supply company system requesting the confidential delivery waybill issuing system to output a delivery waybill corresponding to the shipping information (S1012);

the confidential delivery waybill issuing system receiving logistics delivery information from a logistics company system (S1013);

the confidential delivery waybill issuing system (200) confirming whether a same access account as the access account of the primary merchandise supply company system, acquired from the online shopping mall system, exists in the confidential delivery waybill issuing system and whether a same customer order number as the customer order number included in the shipping information, acquired from the primary merchandise supply company system, exists in the confidential delivery waybill issuing system (an information confirming step) (S1014);

upon confirming at the information confirming step (S1014) that the same customer order number exists and the same access account exists, the confidential delivery waybill issuing system extracting the actual personal information of the customer corresponding to the token information included in the customer order information, received from the online shopping mall system, from a storage means and combining the extracted actual personal information of the customer, the shipping information, received from the primary merchandise supply company system, and the logistics delivery information, received from the logistics company system, to create delivery waybill output information (S1015);

the confidential delivery waybill issuing system directly transmitting the created delivery waybill output information to an output unit of the primary merchandise supply company system requesting to output the delivery waybill (S1016);

the confidential delivery waybill issuing system (200) creating shipping request information using the delivery waybill output information (S1017); and the confidential delivery waybill issuing system (200) providing the created shipping request information to the logistics company system (S1018).

14. A method of confidentially issuing and managing a delivery waybill using virtual personal information matched with credit card information, the method comprising:

a customer terminal (100) or a confidential delivery waybill issuing system terminal (270) providing actual personal information of a customer to a confidential delivery waybill issuing system (S1001);

the confidential delivery waybill issuing system (200) creating virtual personal information corresponding to the actual personal information of the customer, received from the customer terminal (100) or from the confidential delivery waybill issuing system terminal (270), the virtual personal information not being actual personal information (S1002);

a primary merchandise supply company system (400) requesting the confidential delivery waybill issuing system (200) to register an online shopping mall access account thereof (S1004);

the primary merchandise supply company system (400) requesting the confidential delivery waybill issuing system (200) to register secondary to Nth-order merchandise supply companies, which are subordinate merchandise supply companies thereof, as the online shopping mall access account thereof (S1005);

the customer terminal (100) requesting a payment service company system (700) to match the virtual personal information with credit card information of the customer (S2001);

the payment service company system (700) matching the virtual personal information with the credit card information of the customer (S2002);

the customer terminal (100) providing order information for purchasing merchandise and payment information to an online shopping mall system (S1006);

the online shopping mall system (300) requesting the virtual personal information matched with the credit card information from the payment service company system (700) (S2003);

the payment service company system (700) providing the requested virtual personal information matched with the credit card information to the online shopping mall system (300) (S2004);

the online shopping mall system (300) displaying the virtual personal information matched with the credit card information on the customer terminal (100) (S2005);

the customer terminal (100) selecting any one piece of the displayed virtual personal information (S2006);

the online shopping mall system (300) automatically inputting the virtual personal information selected at step S2006 as shipping destination information (S2007);

the online shopping mall system (300) creating customer order information comprising a customer order number and the virtual personal information based on the order information, received from the customer terminal, and the virtual personal information automatically input at step S2007 (S1007);

the online shopping mall system providing the customer order information comprising the customer order number and the virtual personal information and access account information of the primary merchandise supply company system registered at the online shopping mall system to the confidential delivery waybill issuing system (S1008);

the online shopping mall system providing the customer order information with the virtual personal information removed to the primary merchandise supply company system (S1009);

the primary merchandise supply company system providing the customer order information with the virtual personal information removed, received from the online shopping mall system, to any one of secondary to Nth-order merchandise supply company systems, which are subordinate merchandise supply company systems thereof (S1009-1);

the any one of the secondary to Nth-order merchandise supply company systems creating shipping information comprising the customer order number and logistics company information based on the customer order information with the virtual personal information removed (S1010-1);

the any one of the secondary to Nth-order merchandise supply company systems providing the created shipping information to the confidential delivery waybill issuing system (S1011);

the any one of the secondary to Nth-order merchandise supply company systems requesting the confidential delivery waybill issuing system to output a delivery waybill corresponding to the shipping information (S1012);

the confidential delivery waybill issuing system receiving logistics delivery information from a logistics company system (S1013);

the confidential delivery waybill issuing system confirming whether a same access account as the access account of the primary merchandise supply company system, acquired from the online shopping mall system, exists in the confidential delivery waybill issuing system and whether a same customer order number as the customer order number included in the shipping information, acquired from the any one of the secondary to Nth-order merchandise supply company systems, exists in the confidential delivery waybill issuing system (an information confirming step) (S1014);

upon confirming at the information confirming step (S1014) that the same customer order number exists and the same access account exists, the confidential delivery waybill issuing system extracting the actual personal information of the customer corresponding to the virtual personal information included in the customer order information, received from the online shopping mall system, from a storage means and combining the extracted actual personal information of the customer, the shipping information, received from the any one of the secondary to Nth-order merchandise supply company systems, and the logistics delivery information, received from the logistics company system, to create delivery waybill output information (S1015);

the confidential delivery waybill issuing system directly transmitting the created delivery waybill output information to an output unit of the any one of the secondary to Nth-order merchandise supply company systems requesting to output the delivery waybill (S1016);

the confidential delivery waybill issuing system (200) creating shipping request information using the delivery waybill output information (S1017); and the confidential delivery waybill issuing system (200) providing the created shipping request information to the logistics company system (S1018).

15. The method according to claim 14, wherein at step S2004, the payment service company system (700) provides token information matched with the virtual personal information to the online shopping mall system (300), instead of the requested virtual personal information matched with the credit card information, in which case, after step S2004, the method comprises:

the online shopping mall system (300) automatically inputting the token information, received at step S2004, as shipping destination information (S2007);

the payment service company system (700) providing information comprising the virtual personal information and the token information matched with each other to the confidential delivery waybill issuing system (200) (S2008);

the online shopping mall system (300) creating customer order information comprising a customer order number and the token information based on the order information, received from the customer terminal, and the token information, automatically input at step S2007 (S1007);

the online shopping mall system (300) providing the customer order information comprising the customer order number and the token information and registered access account information of the primary merchandise supply company system to the confidential delivery waybill issuing system (S1008);

the online shopping mall system (300) providing the customer order information with the token information removed to the primary merchandise supply company system (S1009);

the primary merchandise supply company system providing the customer order information with the token information removed, received from the online shopping mall system, to any one of secondary to Nth-order merchandise supply company systems, which are subordinate merchandise supply company systems thereof (S1009-1);

the any one of the secondary to Nth-order merchandise supply company systems creating shipping information comprising the customer order number and logistics company information based on the customer order information with the token information removed (S1010-1);

the any one of the secondary to Nth-order merchandise supply company systems providing the created shipping information to the confidential delivery waybill issuing system (S1011);

the any one of the secondary to Nth-order merchandise supply company systems requesting the confidential delivery waybill issuing system to output a delivery waybill corresponding to the shipping information (S1012);

the confidential delivery waybill issuing system receiving logistics delivery information from a logistics company system (S1013);

the confidential delivery waybill issuing system confirming whether a same access account as the access account of the primary merchandise supply company system, acquired from the online shopping mall system, exists in the confidential delivery waybill issuing system and whether a same customer order number as the customer order number included in the shipping information, acquired from the any one of the secondary to Nth-order merchandise supply company systems, exists in the confidential delivery waybill issuing system (an information confirming step) (S1014);

upon confirming at the information confirming step (S1014) that the same customer order number exists and the same access account exists, the confidential delivery waybill issuing system extracting the actual personal information of the customer corresponding to the token information included in the customer order information, received from the online shopping mall system, from a storage means and combining the extracted actual personal information of the customer, the shipping information, received from the any one of the secondary to Nth-order merchandise supply company systems, and the logistics delivery information, received from the logistics company system, to create delivery waybill output information (S1015);

the confidential delivery waybill issuing system directly transmitting the created delivery waybill output information to an output unit of the any one of the secondary to Nth-order merchandise supply company systems requesting to output the delivery waybill (S1016);

the confidential delivery waybill issuing system (200) creating shipping request information using the delivery waybill output information (S1017); and the confidential delivery waybill issuing system (200) providing the created shipping request information to the logistics company system (S1018).

16. A system for confidentially issuing and managing a delivery waybill using virtual personal information matched with credit card information, the system comprising:

a customer terminal (100) for providing actual personal information of a customer to a confidential delivery waybill issuing system (200), confirming virtual personal information corresponding to the actual personal information of the customer from the confidential delivery waybill issuing system, providing order information for purchasing merchandise and payment information to an online shopping mall system, credit card information being used as the payment information, providing the credit card information and the virtual personal information to a payment service company system (700), and requesting the payment service company system to match the virtual personal information with the credit card information;

the confidential delivery waybill issuing system (200) for creating virtual personal information corresponding to the received actual personal information of the customer, forming and storing relationship information between an online shopping mall access account of a primary merchandise supply company and a merchandise supply company in response to a request for registering an access account from a primary merchandise supply company system, determining whether to create delivery waybill output information using the online shopping mall access account information of the primary merchandise supply company and a customer order number included in customer order information, received from the online shopping mall system, upon determining to create the delivery waybill output information, creating the delivery waybill output information using the actual personal information of the customer, logistics delivery information, and shipping information, and directly transmitting the created delivery waybill output information to an output unit of a merchandise supply company system requesting to output a delivery waybill;

the online shopping mall system (300) for creating customer order information comprising the virtual personal information and a customer order number using the order information, received from the customer terminal, and the virtual personal information selected by the customer terminal, providing the customer order information with the virtual personal information removed to the primary merchandise supply company system (400), providing the customer order information comprising the virtual personal information and the customer order number and the access account information of the primary merchandise supply company system to the confidential delivery waybill issuing system, upon receiving the credit card information as the payment information from the customer terminal, requesting virtual personal information matched with the received credit card information from the payment service company system, and providing the virtual personal information, received from the payment service company system, to the customer terminal;

the primary merchandise supply company system (400) for requesting the confidential delivery waybill issuing system (200) to register an online shopping mall access account thereof and to register secondary to Nth-order merchandise supply companies, which are subordinate merchandise supply companies thereof, as the online shopping mall access account thereof, creating shipping information using the customer order information with the virtual personal information removed, received from the online shopping mall system, providing the created shipping information to the confidential delivery waybill issuing system and simultaneously requesting the confidential delivery waybill issuing system to output a delivery waybill, and in a case in which merchandise is supplied through subordinate merchandise supply company systems thereof, providing the customer order information with the virtual personal information removed, received from the online shopping mall system, to any one of secondary to Nth-order merchandise supply company systems without creating the shipping information;

the secondary to Nth-order merchandise supply company systems (500) for, upon receiving the customer order information with the virtual personal information removed, creating shipping information using the received customer order information with the virtual personal information removed and providing the created shipping information to the confidential delivery waybill issuing system and simultaneously requesting the confidential delivery waybill issuing system to output a delivery waybill; and the payment service company system (700) for matching the credit card information and the virtual personal information, received from the customer terminal 100, with each other, and upon receiving a request for virtual personal information matched with specific credit card information from the online shopping mall system (300), providing the requested virtual personal information matched with the specific credit card information to the online shopping mall system (300).

17. The system according to claim 16, further comprising:
a logistics company system (600) for delivering ordered merchandise, wherein
the logistics company system (600) provides logistics delivery information to the confidential delivery waybill issuing system, and
the confidential delivery waybill issuing system (200) creates shipping request information, provides the created shipping request information to the logistics company system (600), and receives collection information from the logistics company system (600).

18. The system according to claim 17, wherein the logistics company system (600) provides the collection information to the confidential delivery waybill issuing system (200), and in this case, the confidential delivery waybill issuing system (200) further uses the collection information in order to determine whether to create the delivery waybill output information.

19. The system according to claim 16, wherein the actual personal information of the customer comprises at least one of a name, telephone number, or address.

20. The system according to claim 16, wherein the customer terminal (100) further provides orderer information to the online shopping mall system in addition to the order information and the payment information, the orderer information not being actual information but being virtual personal information.

21. The system according to claim 16, wherein, upon receiving a specific value to be used as the virtual personal information, the confidential delivery waybill issuing system (200) creates the received specific value as the virtual personal information.

22. The system according to claim 16, further comprising:
   a confidential delivery waybill issuing system terminal (270), wherein
   in a case in which the actual personal information of the customer is provided offline, the confidential delivery waybill issuing system terminal (270) provides the actual personal information of the customer to the confidential delivery waybill issuing system (200).

23. The system according to claim 16, wherein the online shopping mall system (300) further provides order status information to the confidential delivery waybill issuing system (200), in which case the confidential delivery waybill issuing system (200) further uses the order status information in order to determine whether to create the delivery waybill output information.

* * * * *